United States Patent [19]
Yamaguchi et al.

[11] Patent Number: 5,808,772
[45] Date of Patent: Sep. 15, 1998

[54] OPTICAL SCANNER AND IMAGE FORMING APPARATUS UTILIZING OPTICAL SCANNER

[75] Inventors: Masao Yamaguchi, Chiba-ken; Takashi Shiraishi, Kanagawa-ken; Yasuyuki Fukutome, Tokyo, all of Japan

[73] Assignee: Kabushiki Kaisha Toshiba, Japan

[21] Appl. No.: 772,935

[22] Filed: Dec. 23, 1996

[30] Foreign Application Priority Data

Dec. 28, 1995 [JP] Japan ................................. 7-352155

[51] Int. Cl.⁶ ........................................... G02B 26/08
[52] U.S. Cl. .................... 359/204; 359/205; 359/796; 347/244
[58] Field of Search .................. 359/204–207, 359/216–219, 212–215, 710, 717, 718, 793–796, 811, 820; 347/244, 258–261

[56] References Cited

U.S. PATENT DOCUMENTS

| | | | |
|---|---|---|---|
| 1,977,813 | 10/1934 | Tillyer | 359/796 |
| 2,036,622 | 4/1936 | Emmerich | 359/710 |
| 2,043,916 | 6/1936 | Altman | 359/710 |
| 4,690,512 | 9/1987 | Forsyth | 359/796 |
| 5,270,851 | 12/1993 | Makino et al. | 359/206 |
| 5,321,550 | 6/1994 | Maruyama et al. | 359/618 |
| 5,361,168 | 11/1994 | Arai et al. | 359/796 |

*Primary Examiner*—James Phan
*Attorney, Agent, or Firm*—Limbach & Limbach LLP

[57] ABSTRACT

A hybrid cylindrical lens includes a glass lens having a cylindrical incident plane, a substantially flat outgoing radiation plane, and at least one plane surface adjacent to the outgoing radiation plane and a plastic lens unified with the glass lens so as to expose the outgoing radiation plane of the glass lens and at least a part of the plane surface and cover the remaining portions.

17 Claims, 13 Drawing Sheets

OPTICAL SCANNER AND IMAGE FORMING APPARATUS UTILIZING OPTICAL SCANNER

FIELD OF THE INVENTION

The present invention relates to a multi-beam scanner for scanning a plurality of beams, that is usable on color printers, color copying machines, high-speed laser printers or digital copying machines using a plurality of photosensitive drums and an image forming apparatus utilizing this multi-beam scanner.

DESCRIPTION OF THE RELATED ART

On an image forming apparatus, for instance, a color printer or a color copying machine using a plurality of photosensitive drums, a plurality of image forming units corresponding to decomposed color components are provided. For this image forming units, a laser exposing device, that is, an optical scanner is used to provide image data corresponding to color components, that is, a plurality of laser beams.

In case of this type of image forming apparatus, two kinds of examples are known; one is an example wherein a plurality of optical scanners are arranged corresponding to respective image forming units and the other is an example wherein a multi-beam scanner capable of providing a plurality of laser beams is arranged.

In general, an optical scanner has a semiconductor laser beam device as a light source, a first lens group to narrow a diameter of laser beam emitted from a laser beam device to a prescribed size, an optical deflector to continuously reflect the laser beams narrowed by the first lens group in the direction orthogonal to the direction in which a recording medium is conveyed, a second lens group to focus the laser beams deflected by the optical deflector into an image at a prescribed position on a recording medium and the like. Further, in many cases the direction in which the laser beams are deflected by the optical deflector is shown as a main scanning direction and a direction in which a recording medium is conveyed; that is, a direction orthogonal to the main scanning direction is shown as a sub-scanning direction.

By the way, on a post-deflection optical system to focus laser beams deflected by the optical deflector into an image on a recording medium, image forming lenses formed by, for instance, PMMA (Polymethylmethacryl) are used. It is known that the refractive index n of this PMMA changes from 1.4876 to 1.4789 when an ambient temperature changes between, for instance, 0° C. to 50° C. Due to such the change in the refractive index, the laser beam passed through the image forming lenses formed by PMMA is focused to form an image on the image forming surface deviated by about ±12 mm, that is, an image forming position in the sub-scanning direction.

To solve such the problem, by incorporating lenses in the same material as that of lenses used in the post-deflection optical system into the pre-deflection optical system in the state of optimized curvature, it is possible to suppress the deviation of the image forming surface that is generated with the deviation of the refractive index change n resulting from temperature change to ±0.5 mm. That is, when compared with an optical system comprising a pre-deflection optical system using glass lenses and a post-deflection system using plastic lenses, the optical system incorporating plastic lenses in the pre-deflection optical system is capable of correcting the color aberration generated from the change of refractive index of the lenses of the post-deflection optical system due to the temperature change.

As described above, a hybrid lens is arraned in the pre-deflection opetical system to provide the convergence to the laser beam emitted from the semiconductor laser device in the sub-scanning direction. A plastic lens is incorporated in the hybrid lens.

In general, the hybrid lens is composed of a spherical glass lens and a non-spherical plastic lens adhered to this glass lens.

However, the positioning of a plastic lens is difficult when it is adhered to a glass lens. In addition, as the moisture absorption property of glass differs from that of plastic against the environmental change of peripheral portions, for instance, change in humidity, an adhered plastic lens may cause a positional shift or may come off. Because of this, a problem may be produced that the quality of an image formed on the image forming unit is deteriorated as the image forming position of laser beams is shifted.

SUMMARY OF THE INVENTION

An object of the present invention is to provide a multi-beam optical scanner capable of producing images of high quality and an image forming apparatus applied with this optical scanner.

According to the present invention, there is provided a hybrid cylindrical lens comprising a glass lens having an incident plane in a cylindrical shape, a substantially flat outgoing radiation plane and at least one plane surface adjacent to the outgoing radiation plane; and a plastic lens unified with the glass lens so as to expose the outgoing radiation plane and at least a part of the plane surface of the glass lens and cover remaining portions.

According to the present invention, there is provided an optical scanner comprising light sources to generate light beams; a hybrid cylindrical lens to focus the light beams from the light source in a prescribed direction, the hybrid cylindrical lens including: a glass lens having an incident plane in a cylindrical shape, a substantially flat outgoing radiation plane and at least one plane surface adjacent to the outgoing radiation plane; and a plastic lens unified with the glass lens so as to expose the outgoing radiation plane and at least a part of the plane surface of the glass lens and cover remaining portions; and means for positioning the hybrid cylindrical lens with a part of the exposed glass lens brought into contact with a prescribed location.

Further, according to the present invention, there is provided An image forming apparatus comprising light sources to generate a light beams; a hybrid cylindrical lens to focus the light beams from the light sources in a prescribed direction, the hybrid cylindrical lens including: a glass lens having a cylindrical incident plane in a cylindrical shape, a substantially flat outgoing radiation plane and at least one plane surface adjacent to the outgoing radiation plane; and a plastic lens unified with the glass lens so as to expose the outgoing radiation plane and at least a part of the plane surface and cover the remaining portions; means for positioning the hybrid cylindrical lens with a part of the exposed glass lens brought into contact with a prescribed location; image carriers on which electrostatic latent images are formed by the light beams from the light sources led through the hybrid cylindrical lens; and means for developing the electrostatic latent images formed on the image carriers to obtain visible images.

DETAILED DESCRIPTION OF THE PREFERRED EMBODIMENTS

Hereinafter, an embodiment of an optical scanner and an image forming apparatus using this optical scanner of the present invention will be described in detail referring to the attached drawings.

Figure 1:
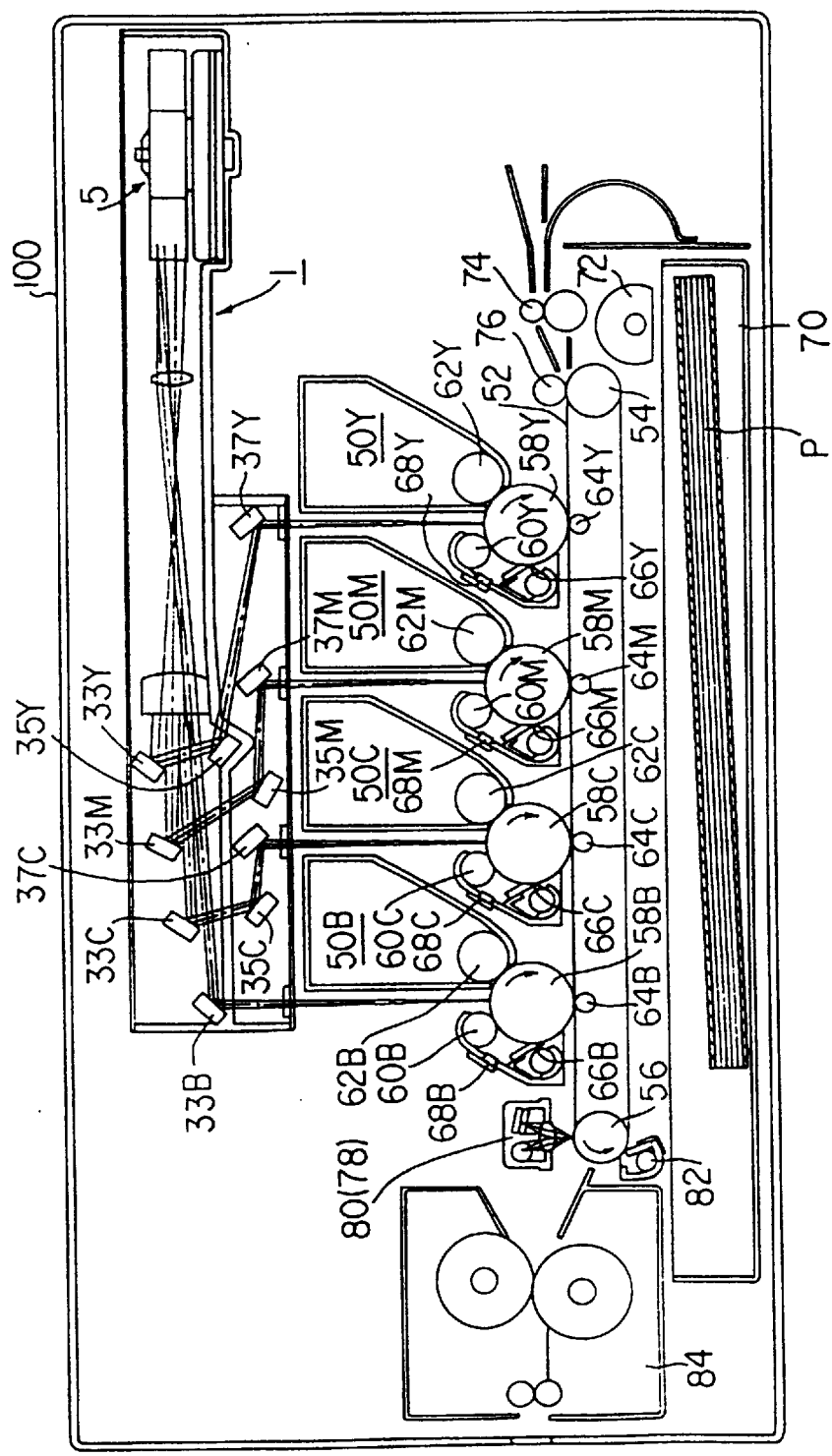
FIG. 1 is a schematic cross-sectional view of an image forming apparatus using a multi-beam optical scanner that is an embodiment of the present invention.

A cross-sectional view of a transfer type color image forming apparatus using a multi-beam optical scanner that is an embodiment of the present invention is shown in FIG. 1. On this type of color image forming apparatus, 4 kinds of image data decomposed into each of such colors as Y or yellow, M or magenta, C or cyan and B or black and 4 sets of various devices are normally used to form images for each of color components corresponding to Y, M, C and B colors and therefore, image data for respective color components and corresponding devices are identified by adding Y, M, C and B to respective reference numerals.

As shown in FIG. 1, an image forming apparatus 100 has a first through a fourth image forming units 50Y, 50M, 50C and 50B to form an image for each of decomposed color components, that is Y=Yellow, M=Magenta, C=Cyan and B=Black.

The image forming units 50Y, 50M, 50C and 50B are arranged in series in order of 50Y, 50M, 50C and 50B at the lower part of an optical scanner 1 corresponding to the positions from where laser beams LY, LM, LC and LB are emitted via third mirrors 37Y, 37M, 37C and a first mirror 33B of the optical scanner 1 corresponding to color component images.

At the lower part of the image forming units 50Y, 50M, 50C and 50B, there are arranged a conveyor belt 52 to convey images formed by the image forming units 50Y, 50M, 50C and 50B.

The conveyor belt 52 is put over a belt driving roller 56 that is driven in the arrow direction by a motor (not shown) and a tension roller 54 and is rotated at a prescribed speed in the direction in which the belt driving roller 56 is rotated.

The image forming units 50Y, 50M, 50C and 50B are provided with photosensitive drums 58Y, 58M, 58C and 58B which are formed in the cylindrical shape and rotatable in the arrow direction and on which electrostatic latent images are formed corresponding to image data to be printed.

At prescribed positions around the photosensitive drums 58Y, 58M, 58C and 58B, charging units 60Y, 60M, 60C and 60B, developing units 62Y, 62M, 62C and 62B, transferring units 64Y, 64M, 64C and 64B, cleaner 66Y, 66M 66C and 66B and discharging units 68Y, 68M, 68C and 68B are arranged in order along the rotating direction of the photosensitive drums 58Y, 58M, 58C and 58B.

The charging units 60Y, 60M, 60C and 60B supply prescribed surface potential to the surfaces of the photosensitive drums 58Y, 58M, 58C and 58B.

The developing units 62Y, 62M, 62C and 62B develop electrostatic latent images formed on the surfaces of the photosensitive drums 58Y, 58M, 58C and 58B with toners in corresponding colors.

The transferring units 64Y, 64M, 64C and 64B are positioned to face the photosensitive drums 58Y, 58M, 58C and 58B, respectively with the conveyor belt 52 put between them and transfer toner images formed on respective photosensitive drums 58Y, 58M, 58C and 58B on the conveyor belt 52 or paper P conveyed by the conveyor belt 52.

The cleaners 66Y, 66M, 66C and 66B remove residual toners remained on the surfaces of the photosensitive drums 58Y, 58M, 58C and 58B after toner images are transferred by the transferring units 64Y, 64M, 64C and 64B.

The discharging units 68Y, 68M, 68C and 68B remove residual potential remained on respective photosensitive drums 58Y, 58M, 58C and 58B after toner images are transferred by the transferring units 64Y, 64M, 64C and 64B.

Further, the laser beams LY, LM, LC and LB guided by mirrors 37Y, 37M, 37C and 37B of the optical scanner 1 are applied between the charging units 60Y, 60M, 60C and 60B and the developing units 62Y, 62M, 62C and 62B.

At the lower part of the conveyor belt 52 there is provided a paper cassette 70 to house recording medium, that is, paper P for transferring images formed by the image forming units 50Y, 50M, 50C and 50B.

At one end of the paper cassette 70 and near a tension roller 54, a paper feed out roller 72 is provided to take out paper P housed in the paper cassette by one sheet at a time (from the top). There is an aligning roller 74 provided between the feed out roller 72 and the tension roller 54. The rotational timing of this aligning roller 74 is so controlled that the leading edge of one sheet of paper P taken out of the cassette 70 is aligned with the leading edges of toner images formed on respective photosensitive drums.

Near the tension roller 54, an adsorbing roller 76 is provided on the outer portion of the tension roller 54 with the conveyor belt 52 put between. This adsorbing roller 76 provides a prescribed electrostatic adsorbing force to one sheet of paper P conveyed at a prescribed timing via the aligning roller 74. Further, the axis of the adsorbing roller 76 and the tension roller 54 are arranged parallel to each other.

At one end of the conveyor belt 52, near and above the outer portion of the belt driving roller 56, registration sensors 78 and 80 are arranged. These registration sensors 78 and 80 detect the position of an image formed on the conveyor belt 52 or the paper P conveyed by the conveyor belt. Further, the registration sensors 78 and 80 are arranged at a prescribed distance in the axial direction of the belt driving roller 56 (FIG. 1 shows only the rear sensor 80 as it is a front cross-sectional view).

On the conveyor belt 52 corresponding to the outer portion of the belt driving roller 56, a conveyor belt cleaner 82 is arranged to remove toners or paper refuse adhered on the conveyor belt 52.

In the direction in which paper P conveyed by the conveyor belt 52 is further conveyed after separated from the tension roller 54, a fixing unit 84 is arranged to fix the toner image transferred on the paper P thereon.

Figure 2:
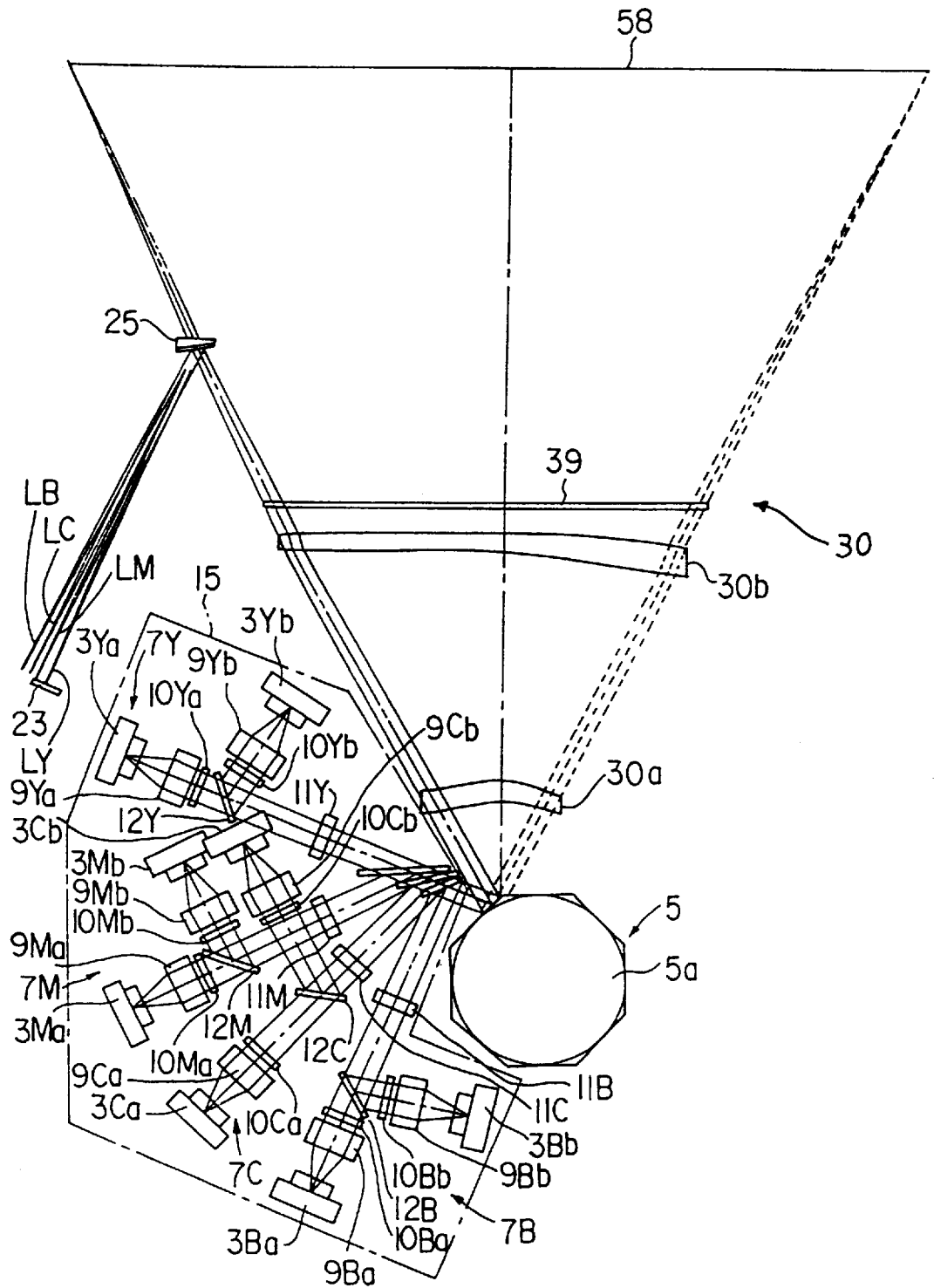
FIG. 2 is a schematic plan view showing optical members of an optical scanner that is incorporated into the image forming apparatus shown in FIG. 1.

In FIG. 2, a multi-beam optical scanner that is used in the color image forming apparatus shown in FIG. 1 is shown. Further, in the color image forming apparatus shown in FIG. 1, 4 kinds of image data in decomposed color for color components of yellow (Y), magenta (M), cyan (C) and B (black) and 4 sets of various units to form images in color components corresponding to Y, M, C and B are normally used. Accordingly, image data in each of color components and corresponding units are identified by adding Y, M, C and B to respective reference numerals.

As shown in FIG. 2, the multi-beam optical scanner 1 has only one optical deflector 5 as a deflecting means to deflect laser beams emitted from the laser devices which are the light sources at a prescribed linear velocity toward the prescribed positions of the photosensitive drums 58Y, 58M, 58C and 58B. Further, hereinafter, the deflecting direction of laser beams by the optical deflector 5 is shown as the main scanning direction.

The optical deflector 5 includes a polgon mirror 5a which has 8 plan emitting mirrors arranged in the regular polygonal shape and a motor (not shown) which rotates the polygon mirror 5a in the main scanning direction at a prescribed velocity. The polygon mirror 5a is formed by, for instance, aluminum. Further, such a surface protective layer as silicon dioxide, etc. is evaporated on the outgoing radiation planes of the polygon mirror 5a.

Between the optical deflector 5 and the surfaces of the photosensitive drums, there are provided a post-deflection optical system 30, a horizontal synchronization detector 23 and a mirror 25.

The post-deflection optical system 30 is composed of a first and a second f θ lenses 30a and 30b to give prescribed optical characteristics to laser beams deflected in a prescribed direction by the outgoing radiation plane of the optical deflector 5. The first and the second f θ lenses 30a and 30b have the function to correct the fluctuation of laser beams produced by the fluctuation of the outgoing radiation plane of the optical deflector 5.

The horizontal synchronization detector 23 detects that an individual beam of the composite laser beams LY, LM, LC and LB emitted from the second f θ lens 30b of the post-deflection optical system 30 arrive at a prescribed position before an area in which an image is to be written.

The mirror 25 is arranged between the post-deflection optical system 30 and the horizontal synchronization detector 23 to partially reflect the composite 2×4 laser beams LY, LM, LC and LB passed through at least one lens in the post-deflection optical system, which will be described later, in the different main and sub-scanning directions toward the horizontal synchronization detector 23.

Next, the pre-deflection optical system between the laser devices which are light sources and the optical deflector 5 will be described in detail.

The optical scanner 1 includes a first and a second (N1=N2=N3=N4=2) laser devices satisfying Ni (i is a positive integer) and has a first through a fourth light sources to generate laser beams corresponding to image data decomposed into color components.

The first through the fourth light sources have a first yellow laser device 3Ya and a second yellow laser device 3Yb to emit laser beans corresponding to an yellow image, a first magenta laser device 3Ma and a second magenta laser device 3Mb to emit laser beams corresponding to a magenta image, a first cyan laser device 3Ca and a second cyan laser device 3Cb to emit laser beams corresponding to a cyan image and a first black laser device 3Ba and a second black laser device 3Bb to emit laser beams corresponding to a black image, respectively.

Further, the mutually paired first through fourth laser beams LYa and LYb, LMa and LMb, LCa and LCb, and LBa and LBb laser beams are emitted from respective laser devices.

Between respective laser devices 3Ya, 3Ma, 3Ca and 3Ba and the optical deflector 5, 4 sets of pre-deflection optical systems 7Y, 7M, 7C and 7B to regulate the sectional beam spot shapes of the laser beams LYa, LC a and LBa from the laser devices 3Ya, 3Ma, 3Ca ad 3Ba to a prescribed shape are arranged.

Now, the pre-deflection optical system 7Y will be described using the laser beam LYa emitted from the first yellow laser device 3Ya to the optical deflector 5 as a representative.

The diffusive laser beam emitted from the first yellow laser device 3Ya is given with a prescribed focusing property by a limited focusing lens 9Ya and its sectional beam is shaped to a prescribed shape by a diaphragm 10Ya. The laser beam LYa passed through the diaphragm 10Ya is further given with a prescribed focusing property only for the sub-scanning direction through a hybrid cylindrical lens 11Y and guided to the optical deflector 5.

Between the limited focusing lens 9Ya and the hybrid cylindrical lens 11Y, a half mirror 12Y is inserted to the optical axis between the limited focusing lens 9Ya and the hybrid cylindrical lens 11Y at a prescribed angle.

In the half mirror 12, the second yellow laser device 3Yb is arranged on the surface opposite to the surface to which the laser beam LYa is applied from the first yellow laser device 3Ya so that the laser beam LYb is applied. This laser beam LYb is applied to the laser beam LYa in the sub-scanning direction at a prescribed beam interval. Further, between the second yellow laser device 3Yb and the half mirror 12Y, a limited focusing lens 9Yb to give a prescribed focusing property to the laser beam LYb from the second yellow laser device 3Yb and a diaphragm 10Yb are provided.

The laser beams LYa and LYb which are substantially combined into one laser beam with a prescribed beam distance in the sub-scanning direction through the half mirror 12Y is passed through a laser composite mirror unit 13 that is described later using FIG. 7A and FIG. 7B and guided to the optical deflector 5.

Hereinafter, in the same manner as above, regarding magenta images, a limited focusing lens 9Ma, a diaphragm 10Ma, a hybrid cylindrical lens 11M, a half mirror 12M, a second magenta laser device 3Mb, a limited focusing lens 9Mb and a diaphragm 10Mb are arranged at prescribed positions between a first magenta laser device 3Ma and a composite laser mirror unit 13.

Regarding cyan images, a limited focusing lens 9Ca, a diaphragm 10Ca, a hybrid cylindrical lens 11C, a half mirror 12C, a second cyan laser device 3Cb, a limited focusing lens 9Cb and a diaphragm 10Cb are arranged at prescribed positions between a first cyan laser device 3Ca and a composite laser mirror unit 13.

Regarding black images, a limited focusing lens 9Ba, a diaphragm 10Ba, a hybrid cylindrical lens 11B, a half mirror 12B, a second black laser device 3Bb, a limited focusing lens 9Bb and a diaphragm 10Bb are arranged at prescribed positions between a first black laser device 3Ba and a composite laser mirror unit 13.

Further, the laser devices 3Ya, 3Ybm 3Ma, 3Mb, 3Ca, 3Cb, 3Ba and 3Bb, the pre-deflection optical systems 7Y, 7M, 7C and 7B, and the composite laser mirror unit 13 are held in one unit body by a holding member that is formed by, for instance, aluminum alloy, etc.

For the limited focusing lenses 9Ya, 9Ma, 9Ca and 9Ba and 9Yb, 9Mb, 9cb and 9Bb, a single non-spherical glass lens or spherical glass lens with a UV rigid plastic non-spherical lens (not shown) adhered is used.

Figure 3:
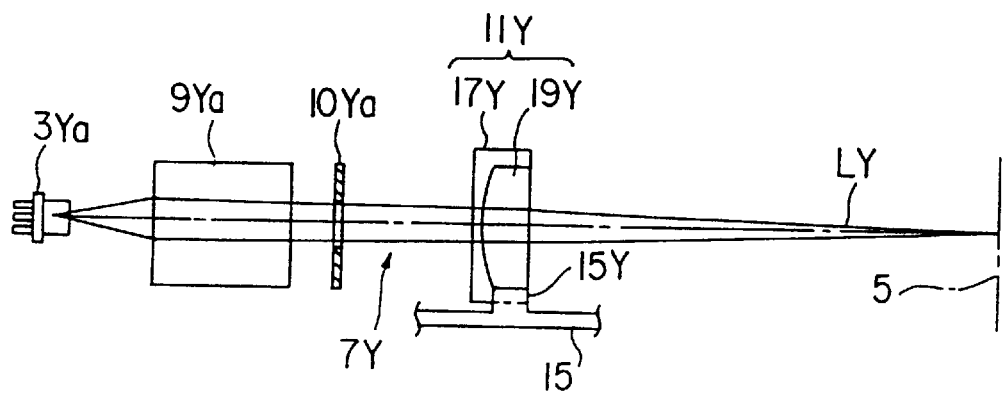
FIG. 3 is a partial cross-sectional view with the optical scanner shown in FIG. 2 cut along the optical axis of the system between the first light source and the optical deflector.

FIG. 3 is a partially sectional view of the pre-deflection optical system 7Y showing the optical path from the laser device 3Ya to the outgoing radiation plane of the optical deflector 5 viewed from the sub-scanning direction. Further, in FIG. 3 only optical parts for one laser beam LY (Lya) are shown representatively.

The hybrid cylindrical lens 11 (Y) is formed by a cylindrical lens 17 (Y) made of such plastic as PMMA (polymethylmethacryl), etc. and a glass cylindrical lens 19 (y) which have a substantially equal curvature for the sub-scanning direction each other.

Optical numerical data of the pre-deflection optical system 7 are shown in Table 1 through Table 3 below.

TABLE 1

Pre-Deflection Optical System Lens Data
Unit of angle: rad.
Effective angle of deviation: .476
Angle of separation: .698
Radius of the reflecting surface inscribed circle of the optical deflector: 33
Rotating center of the reflecting surface of the optical deflector:
(26, 31, 20, 10)
For Yellow & Black

| Radius of Curvature | | | | |
|---|---|---|---|---|
| Main Scanning | Sub-Scanning | Thickness | Material | Others |
| — | — | 11.882 | Air | f = 11.55 |
| Plane | Plane | 52.331 | Air | NA = 0.33 |
| Plane | 2.711E-2 | 0.1 | PMMA | |
| Plane | Plane | 5.0 | Glass | n = 1.922 |
| | | 65.879 | Air | |

Offset from the optical axis on the reflecting surface of the optical deflector: −3.344 Tilt from the optical axis on the reflecting surface of the optical deflector: 2.828E-2 Eccentricity of the main ray of light incident to the cylindrical lens 17: −3.567E-4 (The ray of light b is reverse to this code) Tilt of the main ray of light incident to the cylindrical lens 17: −8.436E-5

TABLE 2

Pre-Deflection Optical System Lens Data
Unit of angle: rad.
Effective angle of deviation: .476
Angle of separation: .698
Radius of the reflecting surface inscribed circle of the optical deflector: 33
Rotating center of the reflecting surface of the optical deflector:
(26, 31, 20, 10)
For Magenta

| Radius of Curvature | | | | |
|---|---|---|---|---|
| Main Scanning | Sub-Scanning | Thickness | Material | Others |
| — | — | 11.882 | Air | f = 11.55 |
| Plane | Plane | 56.664 | Air | NA = 0.33 |
| Plane | 2.711E-2 | 0.1 | PMMA | |
| Plane | Plane | 5.0 | Glass | n = 1.922 |
| | | 65.802 | Air | |

Offset from the optical axis on the reflecting surface of the optical deflector: −1.562 Tilt from the optical axis on the reflecting surface of the optical deflector: 1.213E-2 Eccentricity of the main ray of light incident to the cylindrical lens 17: −3.698E-5 (The ray of light b is reverse to this code) Tilt of the main ray of light incident to the cylindrical lens 17: −8.697E-5

TABLE 3

Pre-Deflection Optical System Lens Data
Unit of angle: rad.
Effective angle of deviation: .476
Angle of separation: .698
Radius of the reflecting surface inscribed circle of the optical deflector: 33
Rotating center of the reflecting surface of the optical deflector:
(26, 31, 20, 10)
For Cyan

| Radius of Curvature | | | | |
|---|---|---|---|---|
| Main Scanning | Sub-Scanning | Thickness | Material | Others |
| — | — | 11.882 | Air | f = 11.55 |
| Plane | Plane | 57.728 | Air | NA = 0.33 |
| Plane | 2.711E-2 | 0.1 | PMMA | |
| Plane | Plane | 5.0 | Glass | n = 1.922 |
| | | 65.790 | Air | |

Offset from the optical axis on the reflecting surface of the optical deflector: −0.537 Tilt from the optical axis on the reflecting surface of the optical deflector: 3.788E-3 Eccentricity of the main ray of light incident to the cylindrical lens 17: 4.448E-3 (The ray of light b is reverse to this code) Tilt of the main ray of light incident to the cylindrical lens 17: −9.950E-5

As clearly seen from Tables 1 through 3, for the limited focusing lens 9 and the hybrid cylindrical lens 11 corresponding to respective color components, the same lens is used for any color component as a simple substance. Further, the pre-deflection optical systems 7Y corresponding to Y (Yellow) and 7B corresponding to B (Black) have the substantially same lens arrangement. The pre-deflection optical systems 7M corresponding to M (Magenta) and 7C corresponding to C (Cyan) have a distance between the limited focusing lens 9 and the hybrid cylindrical lens 11 wider than that of the pre-deflection optical systems 7Y and 7B.

Figure 4:
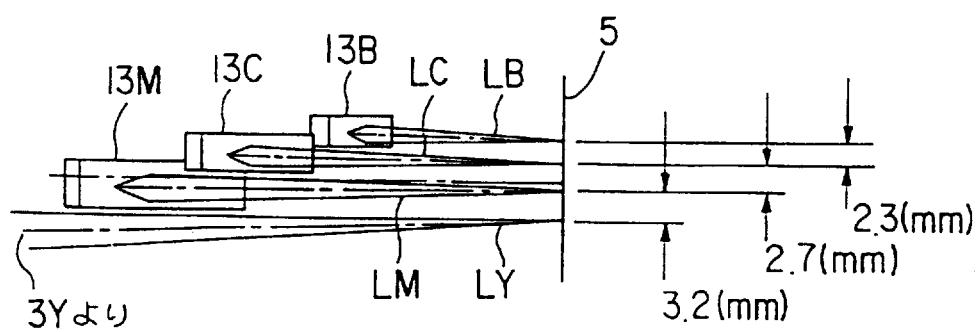
FIG. 4 is a schematic diagram of the partial cross-sectional view in the sub-scanning direction of the optical scanner shown in FIG. 2 and shows the first through the fourth laser beams directing to the optical deflector.

In FIG. 4, the laser beams LY, LM and LC (LY is composed of LYa and LYb, LM is composed of LMa and LMb, and LC is composed of LCa and LCb) emitted to the optical deflector 5 from the reflecting surfaces 13Y, 13M and 13C of the composite laser mirrors in the direction orthogonal to the rotary axis of the reflecting surface of the optical deflector 5 (the sub-scanning direction).

As clearly seen from FIG. 4, the laser beams LY, LM, LC and LB are guided to the optical deflector 5 at mutually different intervals in the direction parallel to the rotary axis of the reflecting surfaces of the optical deflector 5. Further, the laser beams LM and LC are guided to the reflecting surfaces of the optical deflector 5 orthogonally to the rotary axis of the reflecting surfaces of the optical deflector 5 and asymmetrically to the surface containing the center of the sub-scanning direction of the reflecting surface, that is, with the surface containing the optical axis of the optical scanner 1 put between. Further, the mutual distances between the laser beams LY, LM, LC and LB on the reflecting surfaces of the optical deflector 5 are 3.2 mm between LY and LM, 2.7 mm between LM and LC and 2.3 mm between LC and LB.

Figure 5:
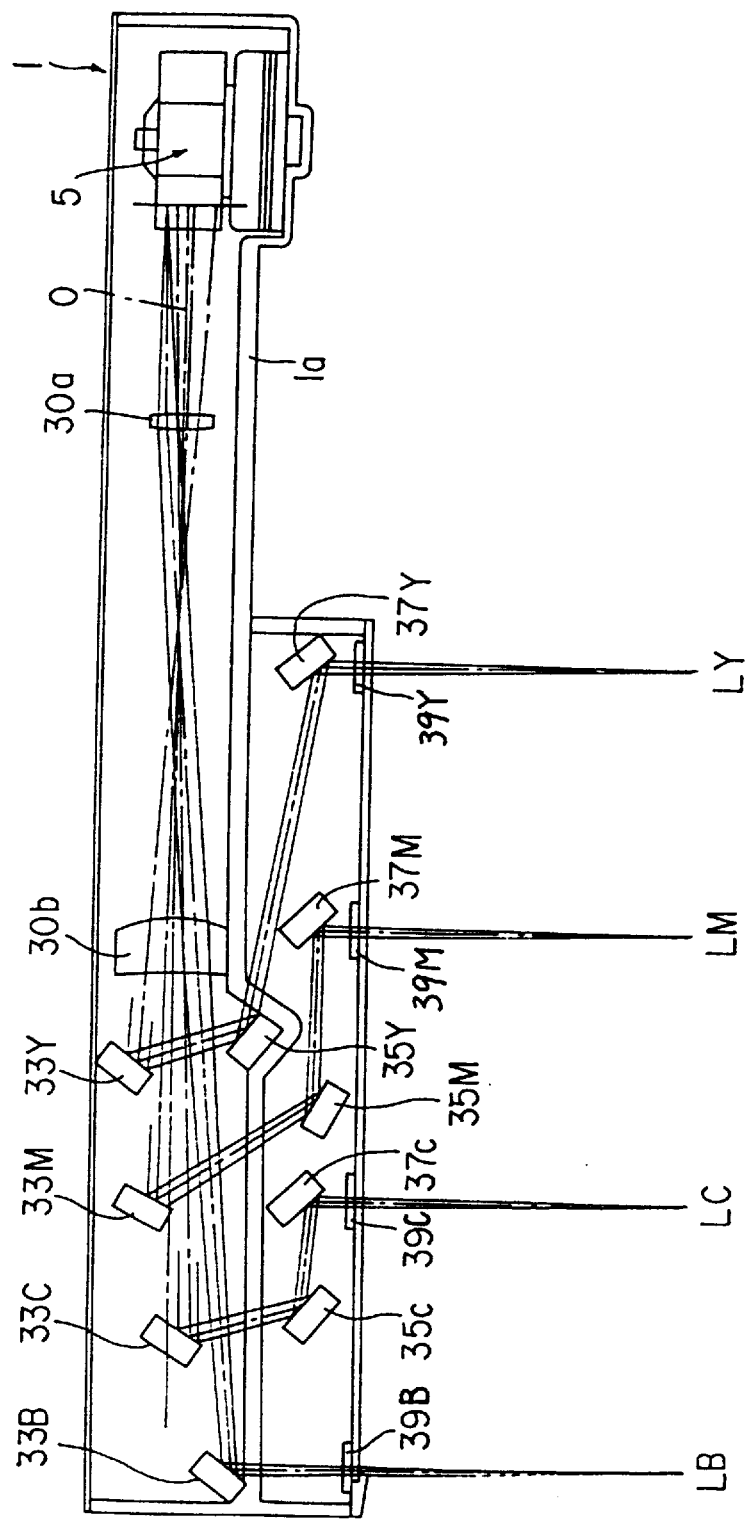
FIG. 5 is a schematic cross-sectional view with the optical scanner shown in FIG. 2 cut at the position of the deflecting angle 0° of the optical deflector.

FIG. 5 shows the state of the optical members arranged between the optical deflector 5 of the optical scanner 1 to the photosensitive drums 58, that is, images viewed from the sub-scanning direction at the position where the angle of deflection of the optical deflector 5 is 0°.

As shown in FIG. 5, between the second f θ lens 30b of the post-deflection optical system 30 and an image surface, there are provided first mirrors 33Y, 33M, 33C and 33B to reflect 2×4 laser beams LY, LM, LC and LB passed through the f θ lens 30b to the image surface, and second and third mirrors 35Y, 35M and 35C and 37Y, 37M and 37C to further reflect laser beams LY, LM and LC by the first mirrors 33Y, 33M and 33C. As clear from FIG. 5, the laser beam LB corresponding to a B (black) image is guided to an image surface without passing through other mirrors after reflectred by the first mirror 33B.

The first and the second f θ lenses 30a and 30b, the first mirrors 33Y, 33M, 33C and 33B and the second mirrors 35Y, 35M and 35C are fixed to, for instance, a plurality of fixing members (not shown) formed in one united body at an intermediate base 1a of the optical scanner 1 by bonding, etc.

Further, the third mirrors 37Y, 37M and 37C are arranged movable at least in one direction vertical to the mirror surface via a fixing rib, which will be described later using FIG. 10, and a tilt adjusting mechanism.

At the positions between the third mirrors 37Y, 37M, 37C and the first mirror 33B and an image surface, where 2×4=8 laser beams LY, LM, LC and LB reflected from the mirrors 33B, 37Y, 37M and 37C are emitted from the optical scanner 1, dust-proof glasses 39Y, 39M, 30C and 39B are arranged to protect the inside of the optical scanner 1.

Next, the optical characteristics between the predeflection optical system 7 and the post-deflection optical system 30 will be described in detail.

The post-deflection optical system 30, that is, the first and the second f θ lenses 30a and 30b of two-pieces set lens are formed by plastic, for instance, PMMA. From this, it is known that the refractive index n changes from 1.4876 to 1.4789 in ambient temperatures between, for instance, 0° C. to 50° C. In this case, the image forming surface where the laser beams passed through the first and the second f θ lenses 30a and 30b are actually condensed, that is, the image forming position in the sub-scanning direction fluctuates by about ±12 mm.

From this, it is possible to suppress the fluctuation of the image forming surface resulting from the change of refractive index n due to the temperature change to ±0.5 mm by incorporating lenses made of the same material as that of lenses used in the post-deflection optical system 30 in the pre-deflection optical system 7 shown in FIG. 3 with the state of optimized curvature. That is, the pre-deflection optical system 7 uses glass lenses and when compared with a conventional optical system using plastic lenses in the post-deflection optical system 30, the color aberration in the sub-scanning direction generated from the change in the refractive index due to the temperature change of lenses of the post-deflection optical system 30 can be corrected.

Figure 6:
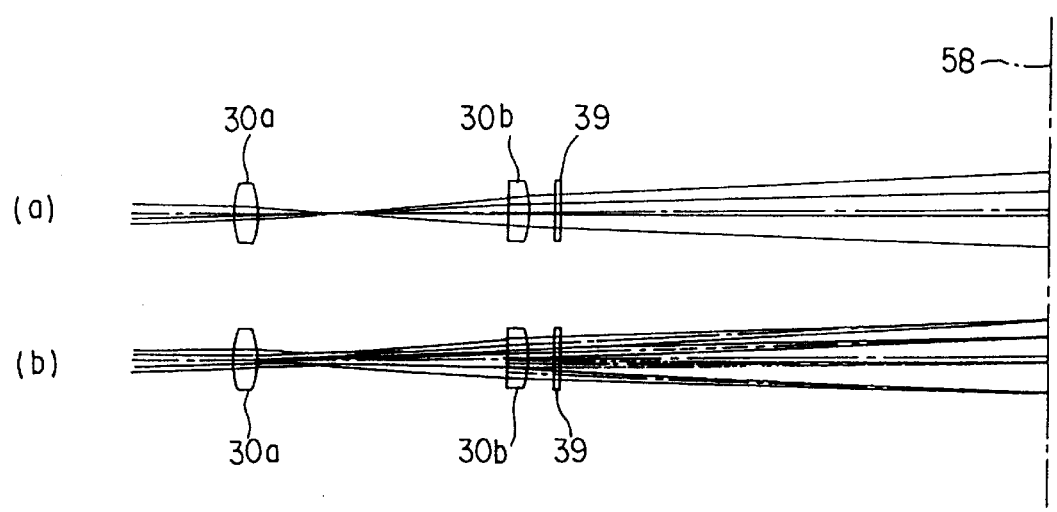
FIG. 6 is an optical path expanded view with mirrors and the like of the optical scanner removed that is cut at the position of the deflection angle 0° of the optical deflector shown in FIG. 5

FIG. 6 shows the arrangement of the laser devices used in the pre-deflection optical system shown in FIG. 2 in detail.

Figure 8A:
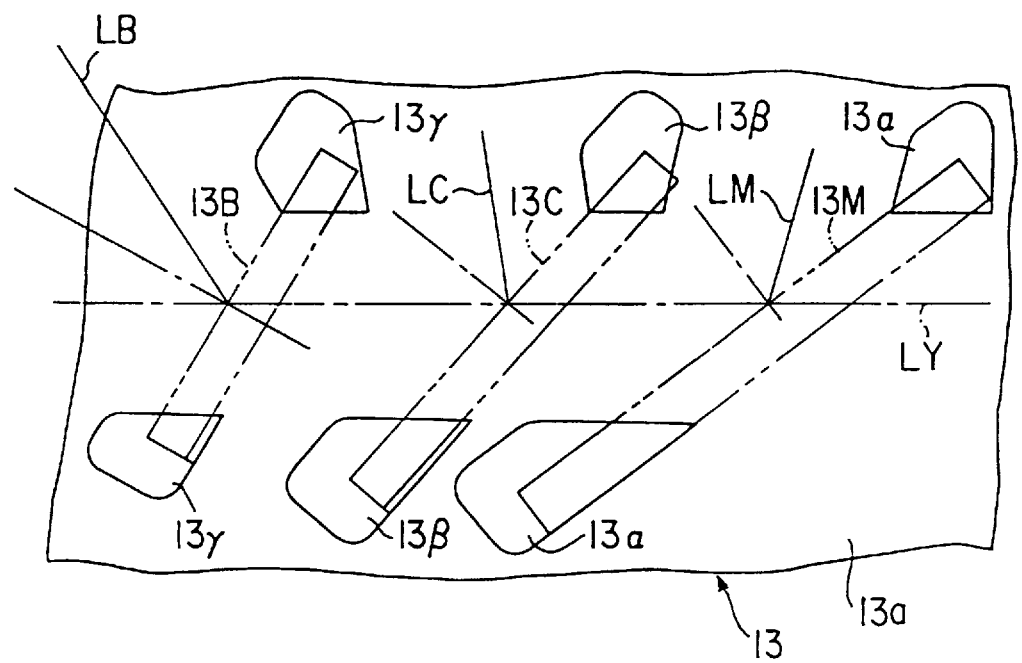
FIG. 8A is a plan view showing a composite laser mirror unit of the optical scanner shown in FIG. 2.
Figure 8B:
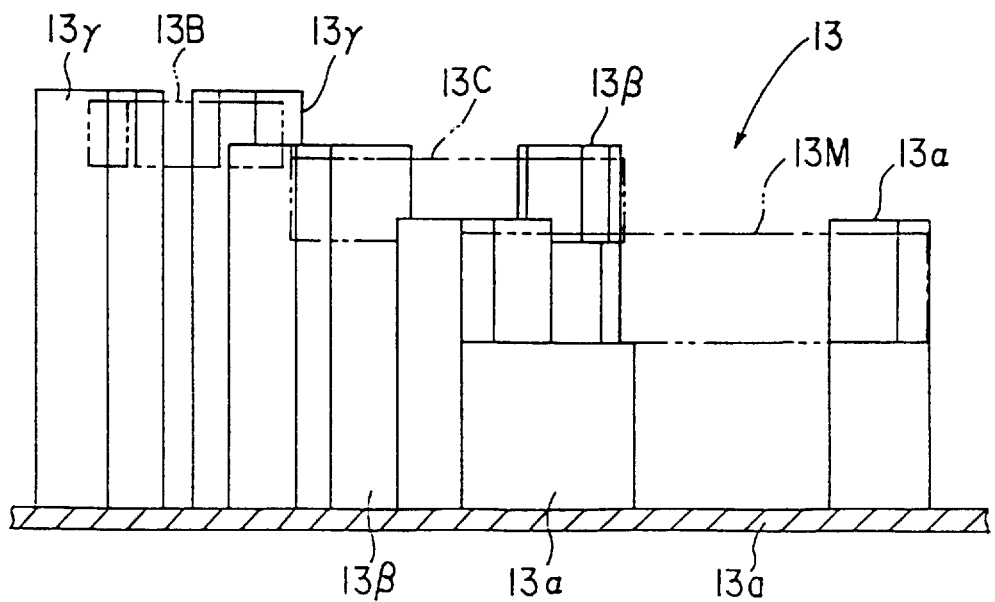
FIG. 8B is a side view showing the composite laser mirror unit of the optical scanner shown in FIG. 2.

As already described using FIG. 2, the first through the fourth laser devices 3Y, 3M, 3C and 3B have two-pieces sets of the first and second yellow laser devices 3Ya and 3Yb, the first and second magenta laser devices 3Ma and 3Mb, the first and second cyan laser devices 3Ca and 3Cb, and the first and second black laser devices 3Ba and 3Bb. Further, the respective paired laser devices are arranged in the sub-scanning direction at a prescribed distance corresponding to the beam distance on the image surface described later. In addition, the respective paired sets of laser devices, that is, the paired sets corresponding to the color components are arranged in 4 layers in the state viewed from the sub-scanning direction at the distance in the sub-scanning direction prescribed in advance corresponding to the respective reflecting regions of the composite laser mirror block 13 shown in FIG. 8A and FIG. 8B.

FIG. 8 shows the composite laser mirror unit 13 which guides the composite first through fourth laser beams LY, LM, LC and LB as one bundle of laser beams to the reflecting surfaces of the optical deflector 5.

The composite laser mirror unit 13 is composed of the first through the third mirror 13M, 13C and 13B that are provided in the number less than the number of color components capable of forming an image (the number of decomposed colors) M by "1", a first through a third mirror holders 13 α, 13 β and 13 γ and a base 13a to support the respective mirror holders 13 α, 13 β and 13 γ. Further, the base 13a and the respective holders 13 α, 13 β and 13 γ are formed in one united body using, for instance, aluminum alloy with a less coefficient of thermal expansion.

By the way, the laser beam LY emitted from the laser device 3Y, that is, the first yellow laser device 3Ya and the second yellow laser device 3Yb is led directly to the reflecting surfaces of the optical deflector 5 as already described. In this case, the laser beam LY passes through the base 13a side, that is, between the mirror 13M fixed by the first holder 13 α and the base 13a rather than the optical axis of the system of the optical scanner 1.

Next, the intensity (quantity of light) of the laser beams LM, LC and LB reflected on the mirrors 13M. 13C and 13B of the composite mirror unit 13 and led to the optical deflector 5 and the laser beam LY led directly to the optical deflector 5 will be described.

According to the composite laser mirror unit 13 shown in FIGS. 7A and 7B, the laser beams LM, LC and LB are by the ordinary mirrors (13M, 13C and 13B) in the region where the laser beams LM, LC and LB in the front stage to apply to the reflecting surfaces of the optical deflector 5 are separated in the sub-scanning direction. Accordingly, the quantity of light of the laser beams LM, LC and LB supplied toward the polygon mirror 5a after reflecting on the reflecting surfaces (13M, 13C and 13B) is maintained almost at more than 90% of the quantity of light emitted from the limited focusing lens 9. Thus, it becomes possible not only to reduce the output of each laser device but also to uniformly correct the aberration of light reached at an image surface because aberration due to a tilted parallel-plate is not generated. As a result, it becomes possible to narrow down respective laser beams and to correspond to get a highly precise image. Further, the laser device 4Y corresponding to Y (yellow) is led directly to the reflecting surfaces of the optical deflector 5 irrespective of any mirror of the composite mirror 13. From these facts, it is possible to reduce the output capacity of laser beams but also remove error in angle of incidence to the reflecting surfaces resulting from the reflection on the mirrors (13M, 13C and 13B) (may be produced in other laser beams reflecting on the composite mirrors).

Next, the relationship between the tilt of the laser beams LY, LM, LC and LB reflected on the polygon mirror 5a of the optical deflector 5 and laser beams LY, LM, LC and LB emitted to the outside of the optical scanner 1 passing through the post-deflection optical system 30 and the mirrors 33B, 37Y, 37M and 37C will be described.

As already described, the laser beams LY, LM, LC and LB reflected on the polygon mirror 5a of the optical deflector 5 and given with a prescribed aberration characteristic by the first and the second f α lenses 30a and 30b are folded in a prescribed direction by the first mirror 33Y, 33M, 33C and 33B.

At this time, the laser beam LB, after reflected by the first mirror 33B, passes through the dust-proof glass 39B and is led to the photosensitive drum 58b. On the contrary, the remaining laser beams LY, LM and LC are led to the mirrors 35Y, 35M and 35C, respectively and reflected by the second mirrors 35Y, 35M and 35C toward the third mirrors 37Y, 37M and 37C. Further, they are reflected on the third mirrors 37Y, 37M and 37C and are focused to form an image on respective photosensitive drums at an almost equal interval after passing through the dust-proof glasses 39Y, 39M and 39C. In this case, the laser beam LB and the laser beam adjacent to the laser beams LB reflected on the first mirror 33B are focused to form an image on the photosensitive drums 58B and 58C, respectively.

By the way, the laser beam LB is only reflected on the mirror 33B after deflected on the polygon mirror 5a and emitted to the photosensitive drum 58 from the optical scanner 1. Thus, the laser beam LB that is led substantially only by the mirror 33B can be secured.

When there are a plurality of mirrors in the optical path, this laser beam LB is beneficial as a reference ray of light when the remaining laser beam L (Y, M and C) is relatively corrected in connection with fluctuation of various aberration characteristics of an image on the image forming surface that is increased (multiplied) with the number of mirrors.

Further, if there are a plurality of mirrors in the optical path, it is desirable to make the number of mirrors used for the laser beams LY, LM, LC or LB to an odd number or even number. That is, as shown in FIG. 5, the number of mirrors in the post-deflection optical system relative to the laser beam LB is 1 (an odd number) excepting the polygon mirror 5a of the optical deflector 5 and the number of mirrors in the post-deflection optical system relative to the laser beams LC, LM and LY is 3 (an odd number), respectively except the polygon mirror 5a. Here, when assuming that the second mirror 35 is omitted in connection with any one of the laser beams LC, LM and LY, the bending direction of the main scanning line due to a tilt of the laser beam lens passing through the optical path where the second mirror 35 is omitted becomes reverse to the bending direction of other laser beams, that is, the main scanning line due to the tilt of odd numbers of mirrors, causing a color deviation that is a harmful problem when reproducing prescribed colors.

Therefore, when reproducing prescribed colors by superposing 2×4 laser beams LY, LM, LC and LB, the number of mirrors arranged in the optical paths of the laser beams LY, LM, LC and LB are substantially unified to an odd or even number.

Figure 9:
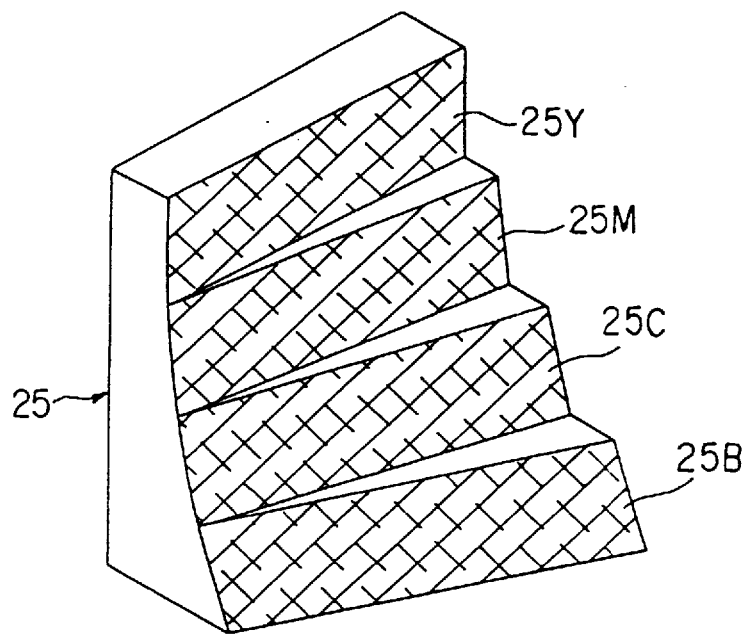
FIG. 9 is a schematic perspective view of a mirror for detecting the horizontal synchronization of the optical scanner shown in FIG. 2.

In FIG. 9, the mirror 25 for the horizontal synchronization is shown in detail.

The mirror 25 for the horizontal synchronization reflects the composite laser beams LY, LM, LC and LB to the horizontal synchronization detector 23 in the main scanning direction at different timings. The mirror 25 has a first through a fourth mirror surfaces 25Y, 25M, 25C and 25B formed at different angles in both the main scanning and sub-scanning directions so as to be able to provide the substantially same height on the horizontal synchronization detector 23 in the sub-scanning direction and respective mirrors 25 (Y, M, C and B).

The mirror block 25a is formed by, for instance, a glass containing PC (polycarbonate). Further, the mirrors 25Y, 25M, 25C and 25B are formed on the corresponding positions of the block 25a, that are formed at prescribed angles, by evaporating such metals as, for instance, aluminum.

Thus, it becomes possible not only to apply the laser beams LY, LM, LC and LB deflected by the optical deflector 5 to the same detecting position of one detector 23 but also to remove the deviation of the horizontal synchronization signal resulting from deviation of position or sensitivity of the detectors that may become a problem when arranging a plurality of detectors. Further, needless to say, the laser beams LY, LM, LC and LB are applied total 4 times per line in the main scanning direction to the horizontal synchronization detector 23 by the horizontal synchronizing mirror 25 and horizontal synchronizing signal is obtained two times per laser beam.

Figure 10:
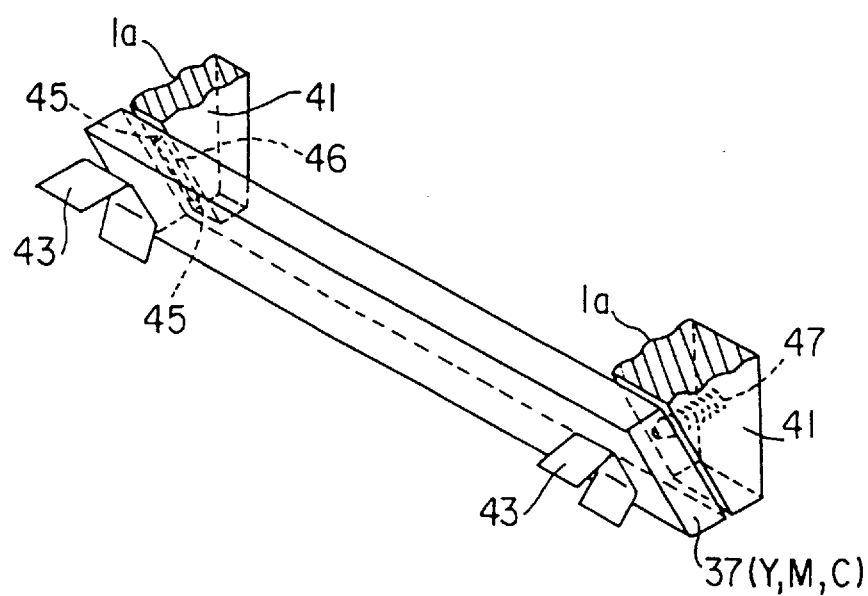
FIG. 10 is a schematic perspective view showing the adjusting mechanism of the emitting mirror of the optical scanner shown in FIG. 2.

FIG. 10 is a schematic perspective view showing a supporting mechanism of the third mirrors 37Y, 37M and 37C.

The third mirrors 37Y, 36M and 37C are held at prescribed positions of the intermediate base 1a of the optical scanner 1 by mirror pressure blade springs 43Y, 43M and 43C that are opposed to fixing portions 41Y, 41M and 41C formed in one united body of the intermediate base 1a and fixing portions 41Y, 41M and 41C with corresponding mirrors put between.

The paired fixing portions 41Y, 41M and 41C are formed at both ends (the main scanning direction) of the mirrors 37Y, 37M and 37C. Two projections 45Y, 45M and 45C are formed on the other fixing portions 41Y, 41M and 41C to hold the mirrors 37Y, 37M and 37C at two points. Further, two projections 45Y, 45M and 45C may be ribs 46Y, 46M and 46C as shown by the dotted line in FIG. 10. Further, on the remaining fixing portions 41Y, 41M and 41C, set screws 47Y, 47M and 47C are provided to support the mirrors held by the projections 45Y, 45M and 45C rotatably in the direction vertical to the mirror surfaces or along the optical axis.

As shown in FIG. 10, the respective mirrors 37Y, 37M and 37C are moved in the direction vertical to the mirror surfaces or in the direction of the optical axis using the projections 45Y, 45M and 45C as the supporting points.

According to this method, the tilt in the main scanning direction , that is, the bending of the main scanning is correctable but the deviation in intervals of the sub-scanning direction of the composite laser beams LY, LM, LC and LB cannot be corrected. Therefore, the deviation in the intervals in the sub-scanning direction is coped with by changing the horizontal al write timing in a registration correction (adjusting) mode that will be described later.

Figure 11:
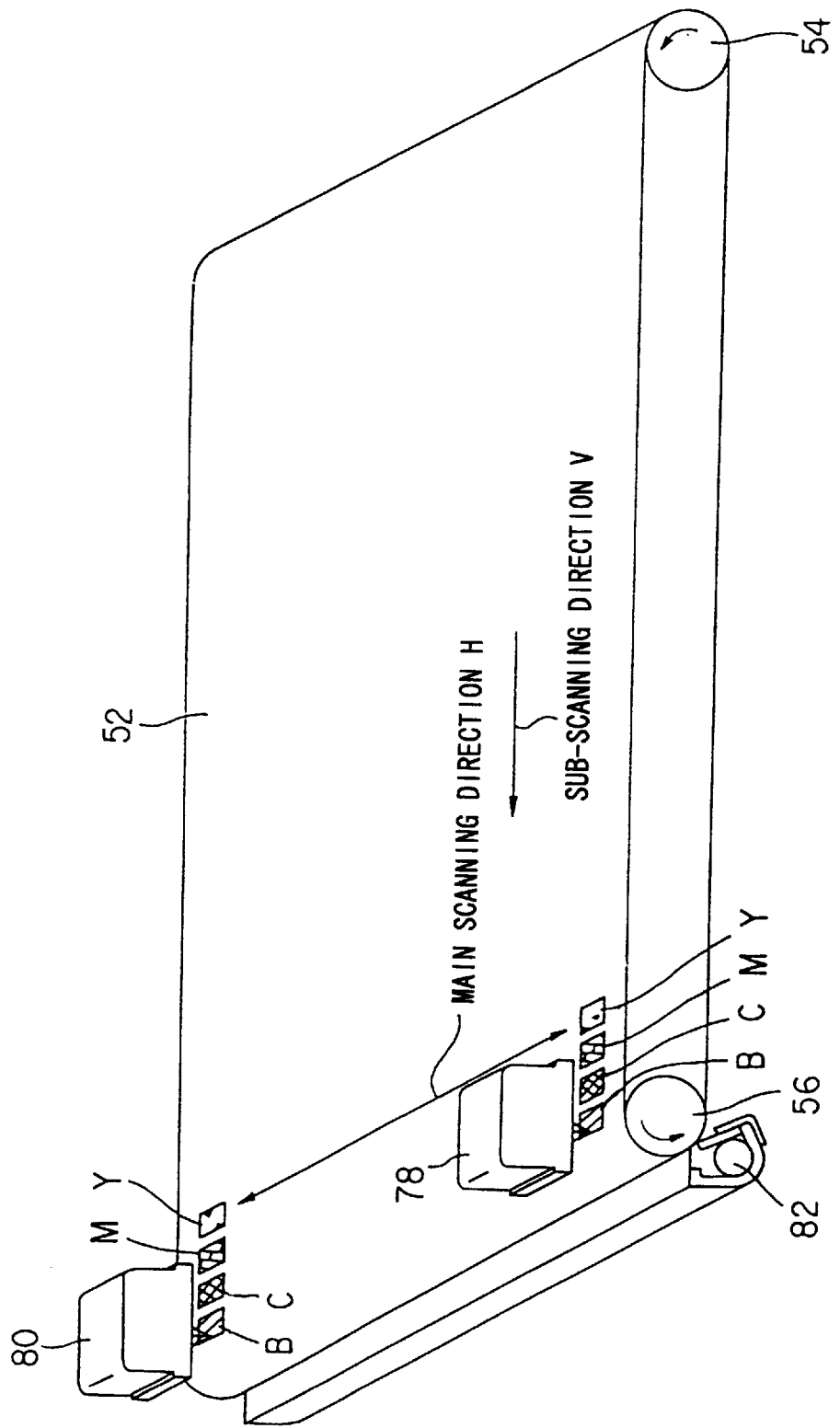
FIG. 11 is a schematic diagram showing the principle of the registration correction in the image forming apparatus shown in FIG. 1.

FIG. 11 is a schematic perspective view of the extracted portion near the conveyor belt of the image forming apparatus shown in FIG. 1. As already described, the registration sensors 78 and 80 are arranged at a prescribed distance along the cross direction of the conveyor belt 52, that is, the main scanning direction H. Further, the line (virtual) connecting the centers of the registration sensors 78 and 80 is defined almost in parallel with the axes of the photosensitive drums 58Y, 58M, 58C and 58B of the image forming units 50Y, 50M, 50C and 50B. It is desirable that the line connecting the centers of the registration sensors 78 and 80 is arranged precisely in parallel with the photosensitive drum 58B of the image forming unit 50B.

Figure 12:
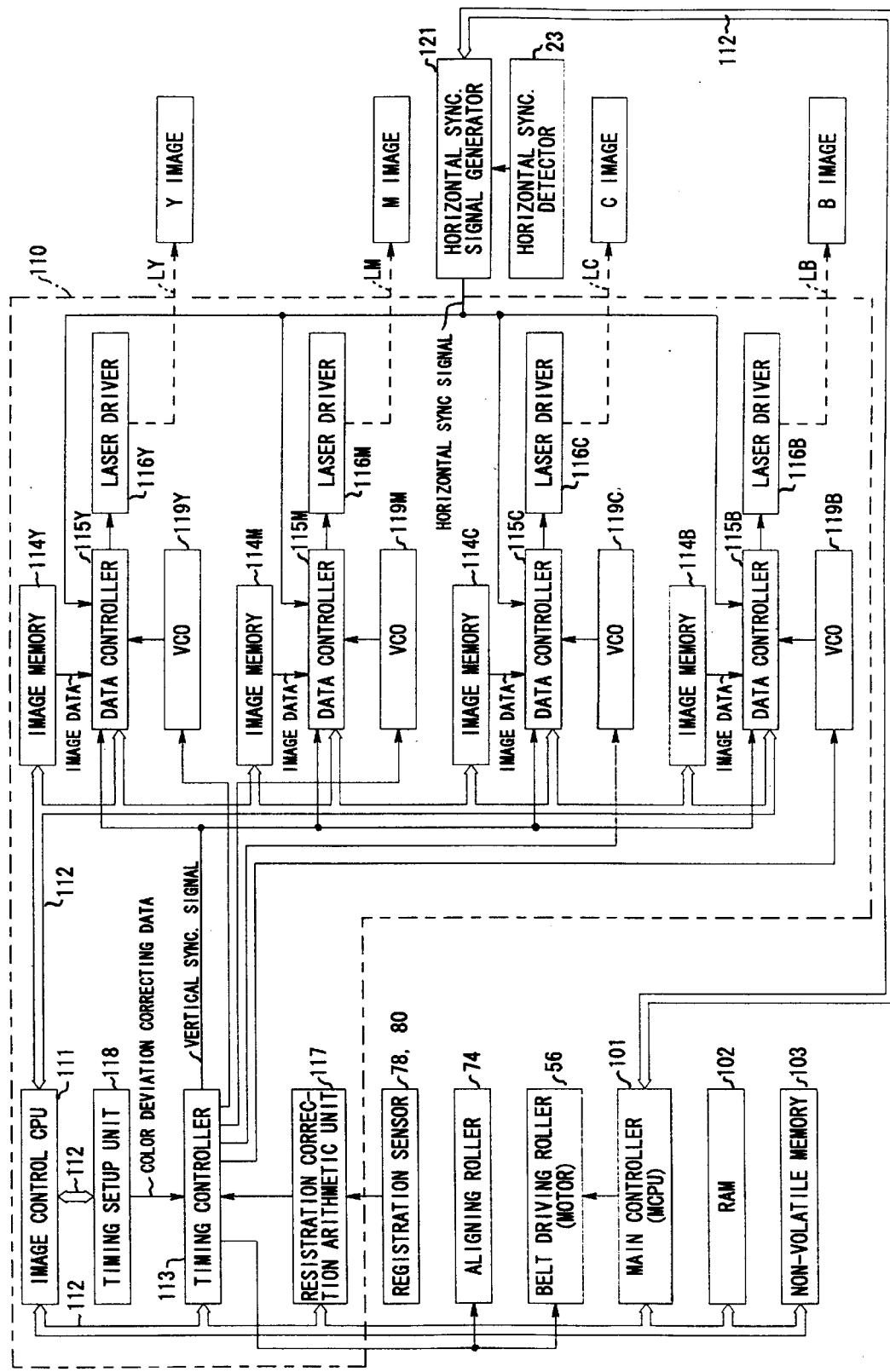
FIG. 12 is a block diagram of the image controller of the image forming apparatus shown in FIG. 1.

FIG. 12 is a schematic block diagram showing an image controller to control the image forming operation of the image forming apparatus shown in FIG. 1.

An image forming apparatus 100 has an image controller 110.

The image controller 110 contains a plurality of control units such as an image control CPU 111, a timing controller 113 and data controllers 115Y, 115M, 115C and 115B corresponding to color components. Further, the image control CPU 111, the timing controller 113 and the data controllers 115Y, 115M, 115C and 115B are mutually connected via a bus line 112.

Further, the image control CPU 111 is connected to a main controller 101 which controls mechanical elements of the image forming apparatus 100, for instance, the operation of a motor or rollers and electrical elements, for instance, voltage or current applied to charging units 60Y, 60M, 60C and 60B, developing units 62Y, 62M, 62C and 62B or transferring units 64Y, 64M, 64C and 64B by the bus line 112. Further, the main controller 101 is connected with a ROM (Read Only Memory) (not shown) storing initial data or test patterns and the like to initialize the image forming apparatus 100, a RAM (Random Access Memory) 102 for temporarily storing input image data or correction data that are computed according to the outputs of the registration sensors 78 and 80, a non-volatile memory 103 for storing various correction data obtained in the adjusting mode that is described later, etc.

The timing controller 113 is connected with laser drivers 116Y, 116M, 116C and 116B, a registration correction arithmetic unit 117, a timing setup unit 118 and oscillation frequency variable circuits (voltage controlled oscillators, that is, voltage controlled oscillators, hereinafter referred to as VCOs) 119Y, 119M, 119C and 119B.

The laser driver 116Y, 116M, 116C and 116B energize the corresponding laser devices 3Ya, 3Yb, 3Ma, 3Mb, 3Ca, 3Cb, 3Ba and 3Bb in order to apply laser beams to the photosensitive drums 58Y, 58M, 58C and 58B of the image forming units 50Y, 50M, 50C and 50B based on image data for color components stored in the image memories 114Y, 114M, 114C and 114B and 114Y, 114M, 114C and 114B.

The registration correction arithmetic unit 117 computes a correcting amount of the timing to write an image by the composite laser beams LY, LM, LC and LB based on signals from the registration sensors 78 and 80.

The timing setup unit 118 defines various timings for operating the image forming units 50Y, 50M, 50C and 50B and the laser devices 3Ya, 3Yb, 3Ma, 3Mb, 3Ca, 3Cb, 3Ba and 3Bb of the light source 3 of the optical scanner 1 based on the signal from the registration correction arithmetic unit 117.

The VCOs 119Y, 119M, 119C and 119B correct the aberrations resulting from solid errors of the image forming units 50Y, 50M, 50C and 50B and a difference in the lengths of the optical paths in the optical scanner 1.

The timing controller 113 is a microprocessor containing a RAM capable of storing correction data in its inside and is integrated in, for instance, a dedicated IC (application specific integrated circuit; hereinafter referred to as ASIC), etc. based on individual specifications.

The data controllers 115Y, 115M, 115C and 115B are microprocessors containing a plurality of line memories, latch circuits and OR gates and are similarly integrated in ASIC, etc.

The registration correction arithmetic unit 117 is a microprocessor containing at least 4 sets of comparators and OR gates and is similarly integrated in ASIC, etc.

The VCOs 119Y, 119M, 119C and 119B are oscillators that are variable according to voltage under which frequency to be output is applied and have a frequency variable range of about ±3%. As this type of oscillator, a harmonic oscillator, an LC oscillator or a simulated reactance variable LC oscillator is used. Further, as VCOs 119Y, 119M, 119C and 119B, a circuit element with a converter incorporated into one united body to convert an output waveform from a sine wave to a square wave is known.

Further, in the image memories 114Y, 114M, 114C and 114B, image data from an external memory (not shown) or host computer are stored. In addition, the output of the horizontal synchronizing detector 23 of the optical scanner 1 is converted into the horizontal synchronizing signal Hsync through a horizontal synchronizing signal generator 121 and input to the data controllers 115Y, 115M, 115C and 115B.

Next, the operation of the image forming apparatus 100 will be described referring to FIG. 1 and FIG. 12.

When the image forming start signal is supplied from the operation panel (not shown) or a host computer, the image control units 50Y, 50M, 50C and 50B are warmed up under the control of the main controller 101 and the polygon mirror 5a of the optical deflector 5 of the optical scanner 1 is rotated at a prescribed rotational speed by the control of the image control CPU 111.

Then, image data to be printed is taken into the RAM 102 from an external memory or a host computer or a scanner (an image reader). A part (or all) of the image data taken into the RAM 102 is housed in the image memories 114Y, 114M, 114C and 114B under the control of the image control CPU 111 of the image controller 110.

Further, under the control of the main controller 101, a feed out roller 72 is energized at a prescribed timing, for instance, based on a vertical synchronizing signal Vsync from the timing controller 113 and one sheet of paper P is taken out of the paper cassette 70. The timing of this taken out paper P is aligned with yellow, magenta, cyan and black toner images provided by the image forming operations of the image forming units 50Y, 50M, 50C and 50B by the aligning roller 74, closely fitted to the conveyor belt 52 by the adsorbing roller 76 and guided to respective image forming units 50 accompanied with the rotation of the conveyor belt 52.

On the other hand, in parallel with or simultaneously with the feeding and conveying operations of paper P, the vertical synchronizing signal Vsync is output from the timing controller 113 based on the data set up by the timing setup unit 118 and registration data and clock data read out of the RAM in the timing controller 113.

When the vertical synchronizing signal Vsync is output from the timing controller 113, the laser drivers 116Y, 116M, 116C and 116B are energized by the data controllers 115Y, 115M, 115C and 115B. When the drivers 116Y, 116M, 116C and 116B are energized, laser beams for one line in the main scanning direction are applied to the photosensitive drums 58Y, 58M, 58C and 58B from the lasers 3Ya, 3Ma, 3Ca and 3Ba, 3Yb, 3Mb, 3Cb and 3Bb of the light sources 3.

The number of clocks of the VCOs 119Y, 119M, 119C and 1193B are counted immediately after the horizontal synchronizing signal Vsync generated from the horizontal synchronizing signal generator 121 based on this laser beams for one line is input. When the counted number of clocks of the VCos 119Y, 119M, 119C and 119B reached prescribed values, image data to be printed are read out of the image memories 114Y, 114M, 114C and 114B.

In succession, under the control of the data controllers 115Y, 115M, 115C and 115B, image data are transferred to the laser drivers 116Y, 116M, 116C and 116B in order to change intensity of the laser beams LY, LM, LC and LB emitted from the light sources 3 and thus, images without aberration are formed on the photosensitive drums 58Y, 58M, 58C and 58B.

As a result, the laser beams LY, LM, LC and LB led to the photosensitive drums 58Y, 58M, 58C and 58B are precisely focused to form an image on the photosensitive drums 58Y, 58M, 58C and 58B without being affected by the fluctuation in the beam spot diameters on the image surfaces resulting from deviations in the optical paths between the lasers 3Y, 3M, 3C and 3B of the light sources 3 to the photosensitive drums 58Y, 58M, 58C and 58B or deviations in diameters of the photosensitive drums 58Y, 58M, 58C and 58B.

The first through the fourth laser beams LY, LM, LC and LB focused on the photosensitive drums 58Y, 58M form electrostatic latent images corresponding to image data on the photosensitive drums 58Y, 58M, 58C and 58B, respectively by changing the potential of the photosensitive drums 58Y, 58M, 58C and 58B charged in advance to a prescribed potential.

These electrostatic latent images are developed by toners having corresponding colors and converted to toner images by the developing units 62Y, 62M, 62C and 62B.

These toner images are conveyed to the paper P by the conveyor belt 52 with the rotation of the photosensitive drums 58Y, 58M, 58C and 58B and transferred on the paper P on the conveyor belt 52 by the transferring unit 64 at a preset timing.

Thus, a toner image in 4 colors accurately superposed is formed on the paper P. Residual toners remained on the photosensitive drums 58&, 58M, 58C and 58B after the toner images are transferred on the paper P are removed by the cleaners 66Y, 66M, 66C and 66B. In addition, residual potential remained on the photosensitive drums 58Y, 58M, 58C and 58B are discharged by the discharging lamps 68Y, 68M, 68C and 68B and used for the following image formation.

The paper P electrostatically carrying a 4 colored image is further conveyed with the rotation of the conveyor belt 52, separated from the conveyor belt 52 by a difference between the curvature of the belt driving roller 56 and the straightforward advancing property of the paper P and is guided to the fixing unit 84. When led to the fixing unit 84, the toners on the paper P are fused and a color toner image is fixed on the paper P which is then ejected on the receiving tray (not shown).

On the other hand, after the paper P is supplied to the fixing unit 84, the conveyor belt 52 is further rotated and toners remained on the conveyor belt 52 are removed by the belt cleaner 82 and used again for conveying paper P fed from the cassette 70.

Next, the construction and the fixing method of the hybrid cylindrical lens 11 will be described in detail.

Figure 7:
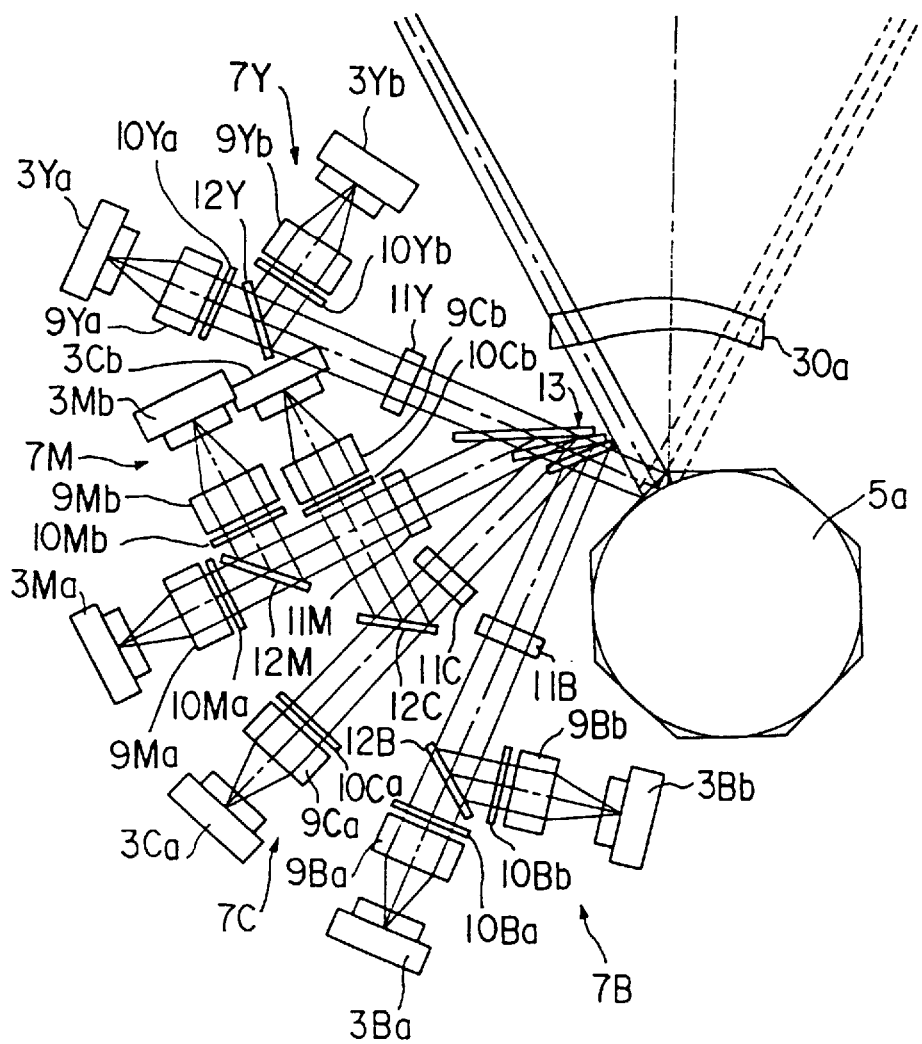
FIG. 7 is a schematic plan view showing the arranged state of the optical members of the pre-deflection optical system of the optical scanner shown in FIG. 2.

As shown in FIG. 7, the hybrid lenses 11Y, 11M, 11C and 11B are arrange between the half mirrors 12Y, 12M, 12C and 12B and the composite laser unit 13.

Further, as described using FIG. 3, this hybrid cylindrical lens 11Y is formed by a plastic cylindrical lens 17Y and a glass cylindrical lens 19Y which have substantially the equal curvature each other. The plastic cylindrical lens 17Y is formed by such materials as, for instance, PMMA (polymethlmethacryl), etc. The glass cylindrical lens 19Y is formed by such materials as, for instance, $TaSF_{21}$, etc. The PMMA made cylindrical lens 17Y is so formed that its surface contacting the air becomes nearly plane. Further, the glass made cylindrical lens 19Y is also so formed that its surface contacting the air becomes nearly plane.

In addition, the cylindrical lens 17Y encircles the outgoing radiation plane of the cylindrical lens 19Y and a part of one end surface that is orthogonal to this outgoing radiation plane and parallel to the sub-scanning direction and the outgoing radiation plane of the cylindrical lens 17Y is adhered to the incident plane, that is, the cylindrical surface of the cylindrical lens 19Y or pressed against a positioning member (not shown) from a prescribed direction and thus, forming the hybrid cylindrical lens 11Y in one united body. Further, the hybrid cylindrical lens 11Y may be in such the structure that the cylindrical lens 17Y is formed in one united body on the incident plane of the cylindrical lens 19Y.

Further, the hybrid cylindrical lens 11Y formed in one united body is positioned at an accurate distance from the limited focal point lens 9Ya and fixed by a fixing member (not shown) with a part of the exposed one end surface of the glass cylindrical lens 19Y brought in contact with a positioning portion 15Y that is formed in one united body with a holding member 15.

The hybrid cylindrical lens 11 described above is shown more in detail in FIGS. 13A and 13B. Further, in FIGS. 13A and 13B, reference numerals only are assigned to the component elements and the hybrid cylindrical lenses 11Y, 11M, 11C and 11B arranged for color components are all the same.

Figure 13A:
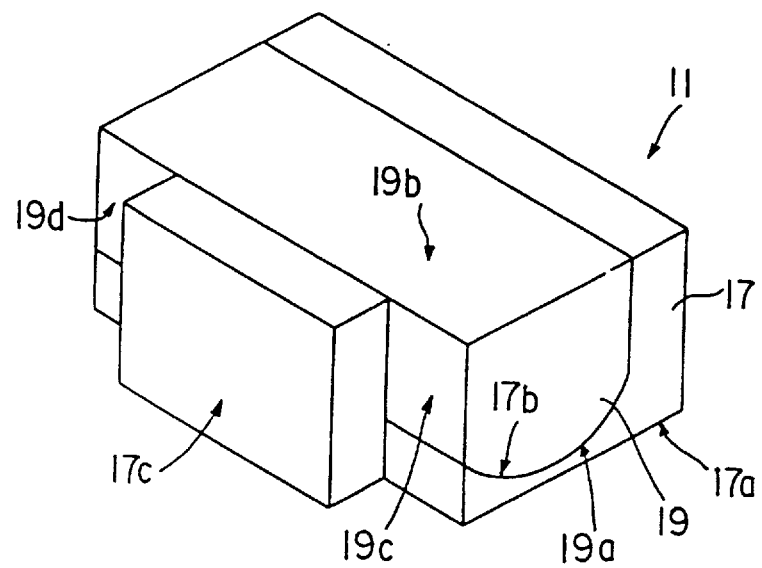
FIGS. 13A and 13B are schematic perspective views showing one example of a hybrid cylindrical lens provided to the optical scanner of the present invention.

As shown in FIG. 13A, the hybrid cylindrical lens 11 is formed by the plastic lens 17 and the glass lens 19. As described above, both the incident plane 17a of the plastic lens 17 and the outgoing radiation plane 17b of the plastic lens 17 are substantially the plane surfaces. The outgoing radiation plane 17b of the plastic lens 17 and the incident plane 19a of the glass lens 19 are the concave surface and the convex surface having a substantially equal curvature in the sub scanning direction.

The outgoing radiation plane 19b, parts of one end surface 19c and 19d of the glass lens 19 are exposed without being encircled by the plastic lens 17. That is, the plastic lens 17 is formed on the bottom 17c as if it is cut in the L-shape. The one end surface 19c and 19d of the glass lens 19 are exposed at this cut portion.

The hybrid cylindrical lens 11 is formed in one united body by adhering the plastic lens 17 to the glass lens 19 after they are individually molded. Further, the hybrid cylindrical lens 11 may be formed by molding the plastic lens 17 on the incident plane of the glass lens 19 in one united body.

At this time, the plastic lens 17 is processed by, for instance, molding. The incident plane 17a and the outgoing radiation plane 17b of the plastic lens 17 are set vertical to the mold pull-out direction and can be processed precisely. On the other hand, it is known that it is difficult to precisely process such the surface parallel to the mold pull-out direction as the bottom surface 17c of the plastic lens 17 and a processing error of about ±1/10 mm is produced.

Accordingly, when fixing the hybrid cylindrical lens 11 by bringing the bottom surface 17c of this plastic lens 17 to the locating portion 15x of the holding member 15, the precise locating is not possible.

Further, it is also known that as the shape of plastic tends to change for the environmental changes such as temperature and humidity, the optical axis tends to cause a distortion. In this case, the fixing accuracy of the hybrid cylindrical lens 11 drops and its optical characteristics (the image surface curve, scanning line bending, etc.) become worse.

Figure 13B:
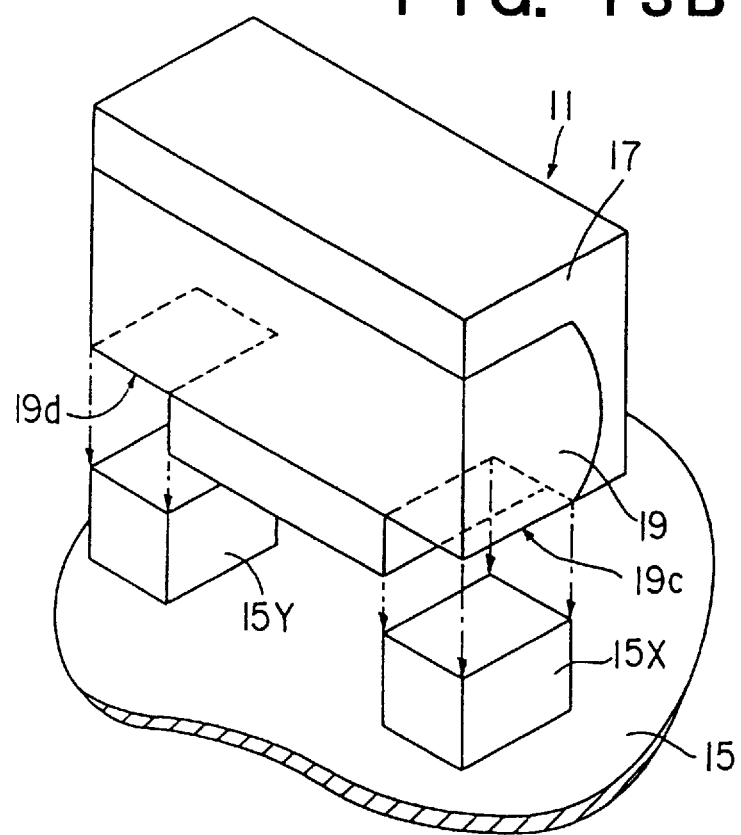

So, as shown in FIG. 13b, the end surfaces 19c and 19d where the glass lens 19 of the hybrid cylindrical lens 11 are exposed are brought into contact with the positioning portions 15X and 15Y formed in one unit with the holding member 15, thus locating the hybrid cylindrical lens 11 and at the same time, the contacting end surfaces 19c and 19d are brought into contact with the tops of the positioning portions 15X and 15Y.

The glass lens 19 has less processing error (±3/100 mm) and change in shape against the environmental change is very small than the plastic lens 17. So, it becomes possible to position the hybrid cylindrical lens 11 including the glass lens 19 at high accuracy when it is positioned based on the end surfaces 19c and 19d of the glass lens 19. Accordingly, it becomes possible to maintain the optical characteristics of the optical system satisfactory.

So, on the optical scanner applied with this optical system, it becomes possible that light beams are led stably to a prescribed image forming position and an image formed on the image forming units becomes highly qualitative.

Figure 14A:
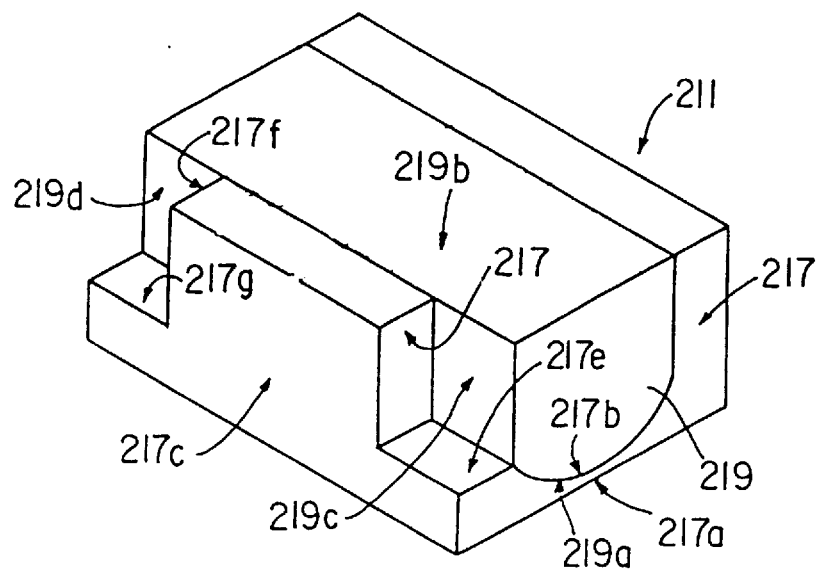
FIGS. 14A and 14B are schematic perspective views showing another example of a hybrid cylindrical lens provided to the optical scanner of the present invention.
Figure 14B:
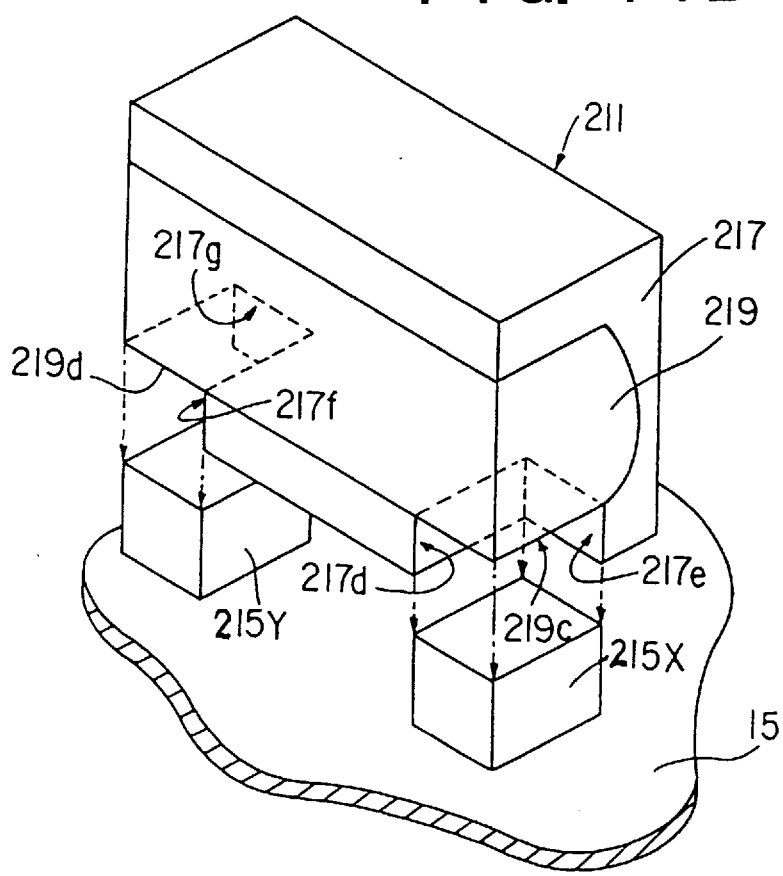

FIG. 14A and FIG. 14B show the hybrid cylindrical lens 11 in another shape schematically.

As shown in FIG. 14A, this hybrid cylindrical lens 211 is formed similarly by a plastic lens 217 and a glass lens 219. An outgoing radiation plane 219b and one end surfaces 219c and 219d of the glass lens 219 are exposed without encircled by the plastic lens 217.

In case of the hybrid cylindrical lens 211 shown in FIG. 14A, a bottom surface 217c of the plastic lens 217 is molded as if only portions corresponding to the one end surfaces 219c and 219d of the glass lens 219 are cut.

Therefore, on the bottom surface 217c of the plastic lens 217, surfaces 217d and 217e are formed so as to expose one end surface 219c of the glass lens 219. Further, on the bottom surface 217c of the plastic lens 217, surfaces 217f and 217g are formed so as to expose one end surface 219d of the glass lens 219.

As shown in FIG. 14B, this hybrid cylindrical lens 211 is positioned by bringing one end surfaces 219c and 219d where positioning portions 215X and 215Y are exposed into contact with the positioning portions 215X and 215Y formed in one united body with the holding member 15.

At this time, one end surface 219c of the glass lens 219 is brought into contact with the top of the positioning portion 215X and further, the surfaces 217d and 217e on the bottom surface 217c of the plastic lens 217 are brought into contact with the side of the positioning portion 215X. In addition, one end surface 219d of the glass lens 219 is brought into contact with the top of the positioning portion 215Y and further, the surfaces 217f and 217g on the bottom surface 217c of the plastic lens 217 are brought into contact with the side of the positioning portion 215Y.

The one end surfaces 219c and 219d of the glass lens 219 are brought into contact with the tops of the positioning portions 215X and 215Y and adhered there by a bonding agent.

Accordingly, the hybrid cylindrical lens 211 can be positioned at a higher accuracy.

Figure 15A:
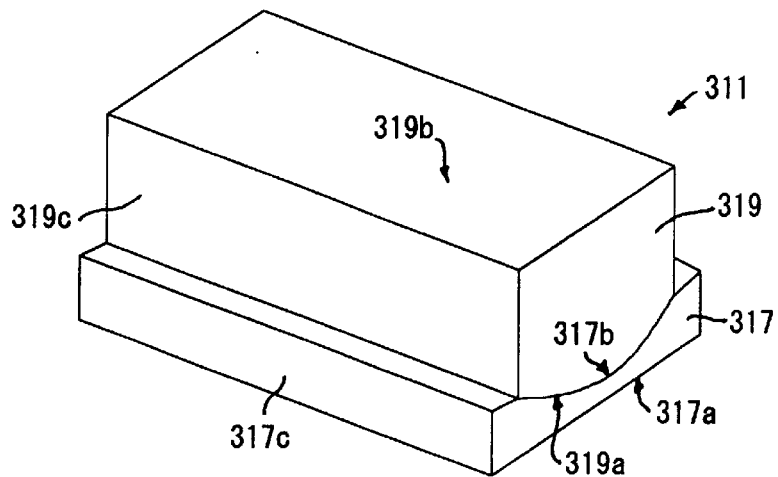
FIGS. 15A and 15B are schematic perspective views showing another example of a hybrid cylindrical lens provided to the optical scanner of the present invention.
Figure 15B:
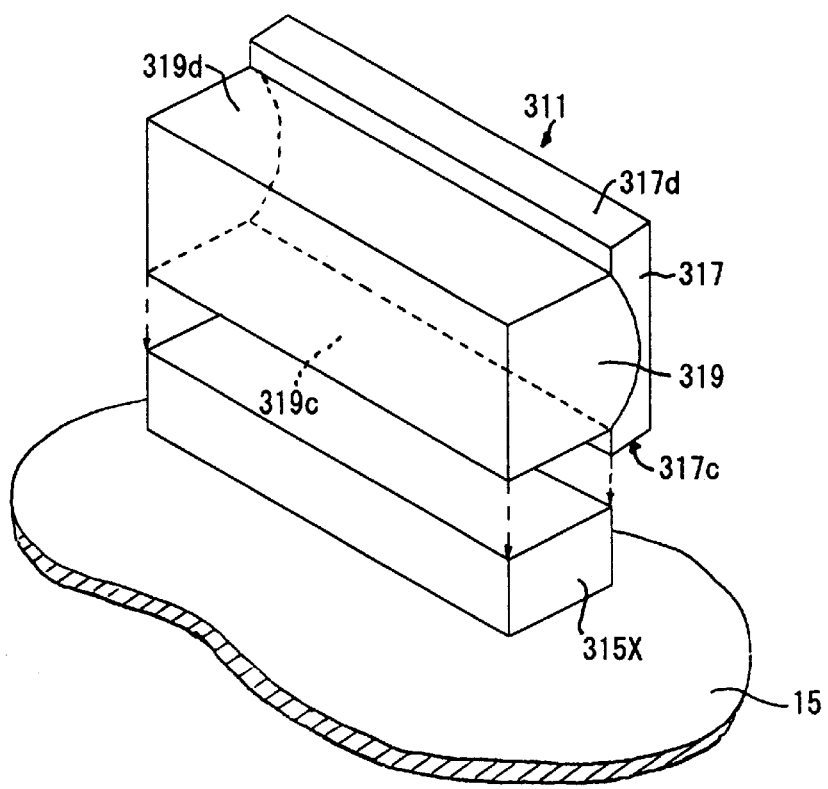

FIG. 15A and FIG. 15B show schematically a hybrid cylindrical lens in another shape.

As shown in FIG. 15A, this hybrid cylindrical lens 311 is composed of a plastic lens 317 and a glass lens 319. The outgoing radiation plane 319b, one end surface 319c and the other end surface 319d of the glass lens 319 are exposed without being encircled by the plastic lens 317. That is, the lower surface portion 317c and the top portion 317d of the plastic lens 317 are formed so as not to cover one end surface 319c and the other end surface 319d of the glass lens 319.

As shown in FIG. 15B, this hybrid cylindrical lens 311 is positioned by bringing one end surface 319c where the glass lens 319 is exposed into contact with the top of the positioning portion 315X that is formed in one united body with the holding member 15.

At this time, one end surface 319c of the glass lens 319 is brought into contact with the top of the positioning portion 315X and adhered to there by a bonding agent.

Therefore, the hybrid cylindrical lens 311 can be positioned at a higher accuracy.

The hybrid cylindrical lenses 11, 211 and 311 in the structure as described above are applicable to all of the hybrid cylindrical lenses 11Y, 11M, 11C and 11B corresponding to color components shown in FIG. 2 and they can be positioned at a higher accuracy, respectively.

The optical numerical data of the hybrid cylindrical lens comprising a glass lens and a plastic lens in one united body as described above will be presented in Table 4. The optical numerical data presented here are image curve, scanning line bending on photosensitive drum and color aberration value, that is ambient temperature changes obtained through optical simulations. Further, these numerical data are those data when a plastic lens formed by PMMA was used.

TABLE 4

|  | Contacted on PMMA | Contacted on Glass |
| --- | --- | --- |
| (a) Temperature: 30° C. | | |
| Image surface curve | 0.8 mm | 0.2 mm |
| Scanning line bending | 61 μm | 25 μm |
| (b) Temperature: 0° C. | | |
| Image surface curve | 1.2 mm | 0.3 mm |
| Scanning line bending | 150 μm | 32 μm |
| (c) Temperature: 50° C. | | |
| Image surface curve | 1.1 mm | 0.3 mm |
| Scanning line bending | 165 μm | 38 μm |

In Table 4, the optical numerical data obtained when the hybrid cylindrical lens was fixed with the PMMA portion, that is, the plastic lens portion was brought into contact with the positioning portions 15X and 15Y of the holding member 15 are compared with those data obtained when the hybrid cylindrical lens was fixed with the glass lens portion brought into contact with the positioning portions.

When the ambient temperature is at a normal temperature (30° C.), if the glass lens portion is brought into contact with the positioning portion as in the hybrid cylindrical lens applicable to the present invention, it is rather possible to suppress the image surface curve and the scanning line bending.

Even when the ambient temperature is changed to, for instance, 0° C. and 50° C., it is similarly rather possible to suppress the image surface curve and the scanning line bending than when the plastic lens portion is brought into contact with the positioning portion.

Further, when the hybrid cylindrical lens is fixed by bringing the glass lens portion into contact with the positioning portion, as the glass lens does not cause a large change in refractive index and shape, it is possible to suppress the image surface curve to about ±0.1 mm against the ambient temperature change from 0° to 50° C. Furthermore, the scanning line bending can be suppressed to a range from 25 to 40 u.

As described above, the hybrid cylindrical lens applied to the optical scanner of the present invention is composed of glass and plastic lenses and all surfaces are encircled by plastic lenses except the outgoing radiation plane and a part of one end surface of the glass lens that are exposed. Thus, the hybrid cylindrical lens composed of glass and plastic lenses in one united body is positioned by bringing one end surface on which the glass lens is exposed into contact with the positioning portion of the holding member.

Accordingly, the hybrid cylindrical lens can be positioned at a high accuracy. Further, as a glass lens does not cause a larger change than a plastic lens in refractive index and shape due to such environmental changes in ambient temperature, humidity, etc., it is possible to provide an optical system having satisfactory optical characteristics such as image surface curvature, scanning line bending, etc.

Therefore, in an image forming apparatus using an optical scanner of the present invention, it is possible to stably supply multiple beams, that is, light beams corresponding to color components from the optical scanner and to make images formed on the image forming units highly qualitative.

As described above, according to the present invention, it is possible to provide an optical scanner capable of stably supplying light beams irrespective of such environmental changes as changes in temperature, humidity, etc. Further, it is also possible to provide an image forming apparatus capable of forming highly qualitative images.

What is claimed is:

1. A hybrid cylindrical lens comprising:
   a glass lens having an incident plane in a cylindrical shape, a substantially flat outgoing radiation plane and at least one plane surface adjacent to the outgoing radiation plane; and
   a plastic lens unified with the glass lens so as to expose the outgoing radiation plane and at least a part of the plane surface of the glass lens and cover remaining portions.

2. A hybrid cylindrical lens as claimed in claim 1, wherein the plastic lens is adhered to the glass lens.

3. A hybrid cylindrical lens as claimed in claim 1, wherein the material of the plastic lens includes polymethylmethacryl (PMMA).

4. A hybrid cylindrical lens as claimed in claim 1, wherein an incident plane of the plastic lens is substantially flat.

5. A hybrid cylindrical lens as claimed in claim 1, wherein on the contact surfaces between the glass lens and the plastic lens, the contact surface of the plastic lens is a concave outgoing radiation plane and the contact surface of the glass lens is a convex incident plane having a curvature substantially equal to the curvature of the plastic lens.

6. An optical scanner comprising:
   light sources to generate light beams;
   a hybrid cylindrical lens to focus the light beams from the light source in a prescribed direction, the hybrid cylindrical lens including:
   a glass lens having an incident plane in a cylindrical shape, a substantially flat outgoing radiation plane and at least one plane surface adjacent to the outgoing radiation plane; and
   a plastic lens unified with the glass lens so as to expose the outgoing radiation plane and at least a part of the plane surface of the glass lens and cover remaining portions; and
   means for positioning the hybrid cylindrical lens with the exposed part of the plane surface of the glass lens brought into contact with a prescribed location.

7. An optical scanner as claimed in claim 6, wherein the plastic lens is adhered to the glass lens.

8. An optical scanner as claimed in claim 6, wherein the material of the plastic lens includes polymethylmethacryl (PMMA).

9. An optical scanner as claimed in claim 6, wherein the incident plane of the plastic lens is a substantially flat.

10. An optical scanner as claimed in claim 6, wherein on the contact surfaces between the glass lens and the plastic lens, the contact surface of the plastic lens is a concave outgoing radiation plane and the contact surface of the glass lens is a convex incident plane having a curvature substantially equal to the curvature of the plastic lens.

11. An optical scanner as claimed in claim 6, wherein the positioning means includes means for adhering the part of the exposed glass lens to the prescribed location.

12. An image forming apparatus comprising:
   light sources to generate a light beams;
   a hybrid cylindrical lens to focus the light beams from the light sources in a prescribed direction, the hybrid cylindrical lens including:
   a glass lens having a cylindrical incident plane in a cylindrical shape, a substantially flat outgoing radiation plane and at least one plane surface adjacent to the outgoing radiation plane; and
   a plastic lens unified with the glass lens so as to expose the outgoing radiation plane and at least a part of the plane surface and cover the remaining portions;
   means for positioning the hybrid cylindrical lens with the exposed part of the plane surface of the glass lens brought into contact with a prescribed location;
   image carriers on which electrostatic latent images are formed by the light beams from the light sources led through the hybrid cylindrical lens; and
   means for developing the electrostatic latent images formed on the image carriers to obtain visible images.

13. An image forming apparatus as claimed in claim 12, wherein the plastic lens is adhered to the glass lens.

14. An image forming apparatus as claimed in claim 12, wherein the material of the plastic lens includes polymethylmethacryl (PMMA).

15. An image forming apparatus as claimed in claim 12, wherein the incident plane of the plastic lens is substantially flat.

16. An image forming apparatus as claimed in claim 12, wherein on the contact surfaces between the glass lens and the plastic lens, the contact surface of the plastic lens is a concave outgoing radiation plane and the contact surface of the glass lens is a convex incident plane having a curvature substantially equal to the curvature of the plastic lens.

17. An image forming apparatus as claimed in claim 12, wherein the positioning means includes means for adhering the part of the exposed glass lens to the prescribed location.

* * * * *